United States Patent
De Rosa et al.

(10) Patent No.: US 11,283,529 B2
(45) Date of Patent: Mar. 22, 2022

(54) NETWORK MANAGEMENT OF AERIAL DEVICES

(71) Applicant: AT&T Intellectual Property I, L.P., Atlanta, GA (US)

(72) Inventors: Giuseppe De Rosa, Atlanta, GA (US); Ronald Kiefer, Louisville, KY (US); Feiling Jia, Pleasanton, CA (US); Mario Kosseifi, Roswell, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 390 days.

(21) Appl. No.: 16/279,983

(22) Filed: Feb. 19, 2019

(65) Prior Publication Data

US 2020/0266903 A1 Aug. 20, 2020

(51) Int. Cl.

| H04B 15/00 | (2006.01) |
| H04B 7/185 | (2006.01) |
| H04W 84/04 | (2009.01) |
| H04W 4/44 | (2018.01) |
| H04W 16/14 | (2009.01) |

(52) U.S. Cl.
CPC ......... *H04B 15/00* (2013.01); *H04B 7/18506* (2013.01); *H04W 84/042* (2013.01)

(58) Field of Classification Search
None
See application file for complete search history.

(56) References Cited

U.S. PATENT DOCUMENTS

| 9,628,168 | B2 | 4/2017 | Wharton et al. |
| 9,848,459 | B2 | 12/2017 | Darrow et al. |
| 10,045,368 | B2 | 8/2018 | Zeng et al. |
| 10,084,531 | B2 | 9/2018 | Feria et al. |
| 10,127,822 | B2 | 11/2018 | Damnjanovic et al. |
| 10,522,046 | B2 * | 12/2019 | Wang ..................... G01S 5/0027 |
| 2002/0065082 | A1 * | 5/2002 | Yegani .................. H04W 72/10 455/452.1 |
| 2017/0295069 | A1 * | 10/2017 | Sweet, III ......... C23C 16/45531 |

(Continued)

FOREIGN PATENT DOCUMENTS

| CN | 108702638 A | * | 10/2018 | ............ H04W 36/08 |
| CN | 109178327 A | * | 1/2019 | |

(Continued)

*Primary Examiner* — Mohammed Rachedine
(74) *Attorney, Agent, or Firm* — Amin, Turocy & Watson, LLP

(57) ABSTRACT

Example methods, apparatuses, systems, and articles of manufacture (e.g., physical storage media) to facilitate interference mitigation of aerial devices on a radio access network are disclosed. An example method includes receiving, by a processor from a base station of the radio access network, an indication of an interference event associated with the base station, and determining, by the processor, a set of unmanned aerial vehicles (UAVs) associated with the base station during flight of the set, where the interference event is at least partially attributed to each UAV of the set. The method further includes selecting, by the processor, a UAV among the set based on a respective traffic profile associated with each UAV of the set, and providing, by the processor, an instruction to the UAV to cause an adjustment of an operation of the UAV to reduce an interference impact of the UAV on the base station.

20 Claims, 10 Drawing Sheets

(56) References Cited

U.S. PATENT DOCUMENTS

| | | |
|---|---|---|
| 2018/0025650 A1 | 1/2018 | Taveira |
| 2018/0124813 A1 | 5/2018 | Li et al. |
| 2018/0167848 A1 | 6/2018 | Lei et al. |
| 2018/0279348 A1 | 9/2018 | Huang et al. |
| 2018/0288630 A1 | 10/2018 | Guirguis et al. |
| 2019/0306675 A1* | 10/2019 | Xue .................. H04W 4/40 |
| 2020/0359234 A1* | 11/2020 | Maattanen ........... G08G 5/0069 |
| 2020/0374889 A1* | 11/2020 | Kalhan ........... H04W 36/00837 |

FOREIGN PATENT DOCUMENTS

| | | | | |
|---|---|---|---|---|
| CN | 110199566 A | * | 9/2019 | ........... G08G 5/0026 |
| WO | WO-0011879 A1 | * | 3/2000 | ............ H04W 12/08 |
| WO | WO 2018/175870 | | 9/2018 | |
| WO | WO-2019203884 A1 | * | 10/2019 | .......... H04W 72/005 |

* cited by examiner

NETWORK MANAGEMENT OF AERIAL DEVICES

FIELD OF THE DISCLOSURE

This disclosure relates generally to aerial devices and, more particularly, to facilitating network management of aerial devices.

BACKGROUND

Unmanned aerial vehicles (UAVs), also referred to as drones or unmanned aerial systems (UASs), may be mobile platforms capable of acquiring (e.g., sensing) information, delivering goods, handling objects, and/or performing other actions, in many operating scenarios/applications. UAVs may be utilized to travel to remote locations that are inaccessible to manned vehicles, locations that are dangerous to humans, and/or any other locations more suited for unmanned vehicles than manned vehicles. Upon reaching such locations, drones can perform many actions, such as acquiring sensor data (e.g., audio, image, video, and/or other sensor data) at a target location, delivering goods (e.g., packages, medical supplies, food supplies, engineering materials, etc.) to the target location, handling objects (e.g., retrieving objects, operating equipment, repairing equipment, etc.) at the target location, and so forth. In the various operating scenarios/applications, the actions performed by the UAVs may require navigating the UAVs and maintaining network connectivity, such as connectivity to a cellular network.

SUMMARY

Using various embodiments, interference mitigation of user equipment (UEs) can facilitate maintaining of network connectivity of the UEs, including UAVs, by a wireless network. In various aspects, the UEs can maintain connectivity to and communicate with base stations (e.g., also referred to as access points or cells) of a cellular network (e.g., a radio access network of the cellular network) while at flight altitude or ground level. The various embodiments may be used for UAVs and/or aerial devices of various sizes, including small UAVs (sUAVs) and larger UAVs, shapes, weight, speed, battery life, and/or other characteristics/traits. The UAVs and/or aerial devices may be with or without passengers.

When a UE is utilizing a serving access point of the wireless network, the UE utilizes capacity of the serving access point while contributing interference to other access points of the wireless network, such as neighboring access points of the serving access point. Traditionally, for example, cellular networks are optimized for devices connecting at a ground level, such as two meters or less off the ground, where typical devices (e.g., mobile phones) generally operate. In such cases, ground level objects (e.g., buildings and other manmade objects, trees and other natural obstacles, etc.) and geographic conditions (e.g., landforms including hills, mountains, etc. that may affect signal transmissions) may cause signal attenuation. Therefore, cellular base stations are generally optimized based on these factors for devices affected by such obstacles.

However, UEs, such as UAVs, at higher altitudes may instead encounter little to no ground level obstructions from ground level objects and may generate signal interference on multiple access points of the network. As such, interference impact to the wireless network attributed to (e.g., associated with, correlated to, estimated to be caused/contributed by) UEs at higher altitudes may generally be higher than for terrestrial UEs (e.g., also referred to as ground-based UEs or ground level UEs) due to the generally lower path losses between the higher altitude UEs and different access points of the wireless network. In this regard, the interference experienced by a neighboring access point may be based at least on a power received by the neighboring access point from the UE due to a transmission from the UE to the UE's serving access point.

Quality of the UEs' connection to the wireless network may be based on performance characteristics including accessibility (e.g., radio resource control (RRC) setup success rate), mobility (e.g., handover success rate), utilization/occupancy, and/or other characteristics. In some cases, the performance characteristics may be, may include, or may be referred to as, key performance indicators (KPIs). Examples of KPIs may include those provided in the $3^{rd}$ Generation Partnership Project (3GPP) standard, including accessibility, retainability, integrity, availability, and mobility. For a given UE, uplink performance characteristics of the UE may be based on a call drop rate, handover success rate, throughput, and/or other performance characteristics associated with user experience.

Using various embodiments, interference impact due to accommodation of, for example, UEs at flight altitude by the wireless network to facilitate maintaining/sharing of network connectivity (e.g., network resources) to UEs and thus facilitate coexistence of aerial UEs and terrestrial UEs. Interference impact may be mitigated in a wider geographic location corresponding to areas of pertinence associated with UEs connected to access points of the wireless network. In an aspect, a UAV's network resource access and utilization may be scheduled on a per region level (e.g., scheduling takes into consideration network impact of the UAV on a cell tower cluster level, square-mile level, or other region level) in addition to a per cell level in order to control and limit interference on extended regions. In some cases, a series of progressive mitigation actions may be performed on the UEs to mitigate interference impact.

An access point may determine that it is impacted by interference based on power received by one or more antennas of the access point. In some cases, interference may be provided in units of dB or dB per physical resource block. For a given access point impacted by interference (e.g., interference above an interference threshold), UEs associated with such interference impact may be identified and one or more of these UEs may be selected for mitigation to reduce an interference impact associated with the selected UE(s). Selection may be based on one or more traffic profiles associated with the UE(s). In some cases, a traffic profile associated with a HE is indicative of actions performed or to be performed by the UE and/or a priority level associated with the UE. An instruction may be sent to the UEs selected for mitigation to cause adjustment of an operation of the UEs to reduce an interference impact of the UEs on the network in general and the given access point in particular. By way of non-limiting example, to mitigate interference associated with the selected UE, the instruction may include an instruction to the UE to cause the UE to adjust one or more of a data compression (e.g., data size transmitted by the UE), a throughput, an uplink power, a queueing scheme, and/or an uplink power of the UE, and/or to migrate the UE to a different communication protocol/technology or different type/category associated with a communication protocol/technology.

In one or more embodiments, a method to facilitate interference mitigation for a radio access network includes receiving, by a processor from a base station of the radio access network, an indication of an interference event associated with the base station. The method further includes determining, by the processor, a set of UAVs associated with the base station during a flight of the set of UAVs, where the interference event is at least partially attributed to each UAV of at least a subset of the set of UAVs. The method further includes selecting, by the processor, a UAV among the subset based on a respective traffic profile associated with each UAV of the subset. The method further includes providing, by the processor, an instruction to the UAV to cause an adjustment of an operation of the UAV to reduce an interference impact of the UAV on the base station.

In one or more embodiments, a system to facilitate interference mitigation for a radio access network includes one or more processors. The system further includes a non-transitory machine readable medium comprising instructions stored thereon, which when executed by the one or more processors, cause the one or more processors to perform operations including receiving an indication of an interference event associated with a base station of a plurality of base stations of the radio access network. The operations further include determining a set of areas of pertinence, wherein each area of pertinence of the set of areas of pertinence includes the base station. The operations further include determining a set of devices, where each device of the set of devices is associated with a corresponding area of pertinence among the set of areas of pertinence. The operations further include selecting a device of the set of devices based on a priority associated with the device. The operations further include providing an instruction to the device to cause an adjustment of an operation of the device to reduce an interference impact on the base station associated with the device.

In one or more embodiments, a tangible or non-transitory machine readable storage medium including machine readable instructions which, when executed, cause one or more processors of a device to perform operations including receiving an indication of an interference event associated with a base station of a radio access network. The operations further include identifying a UAV associated with the interference event based on a profile associated with the UAV. The operations further include providing, during a flight of the UAV, an instruction to the UAV to cause an adjustment of an operation of the UAV to reduce an interference impact of the UAV on the base station.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Figure 1:
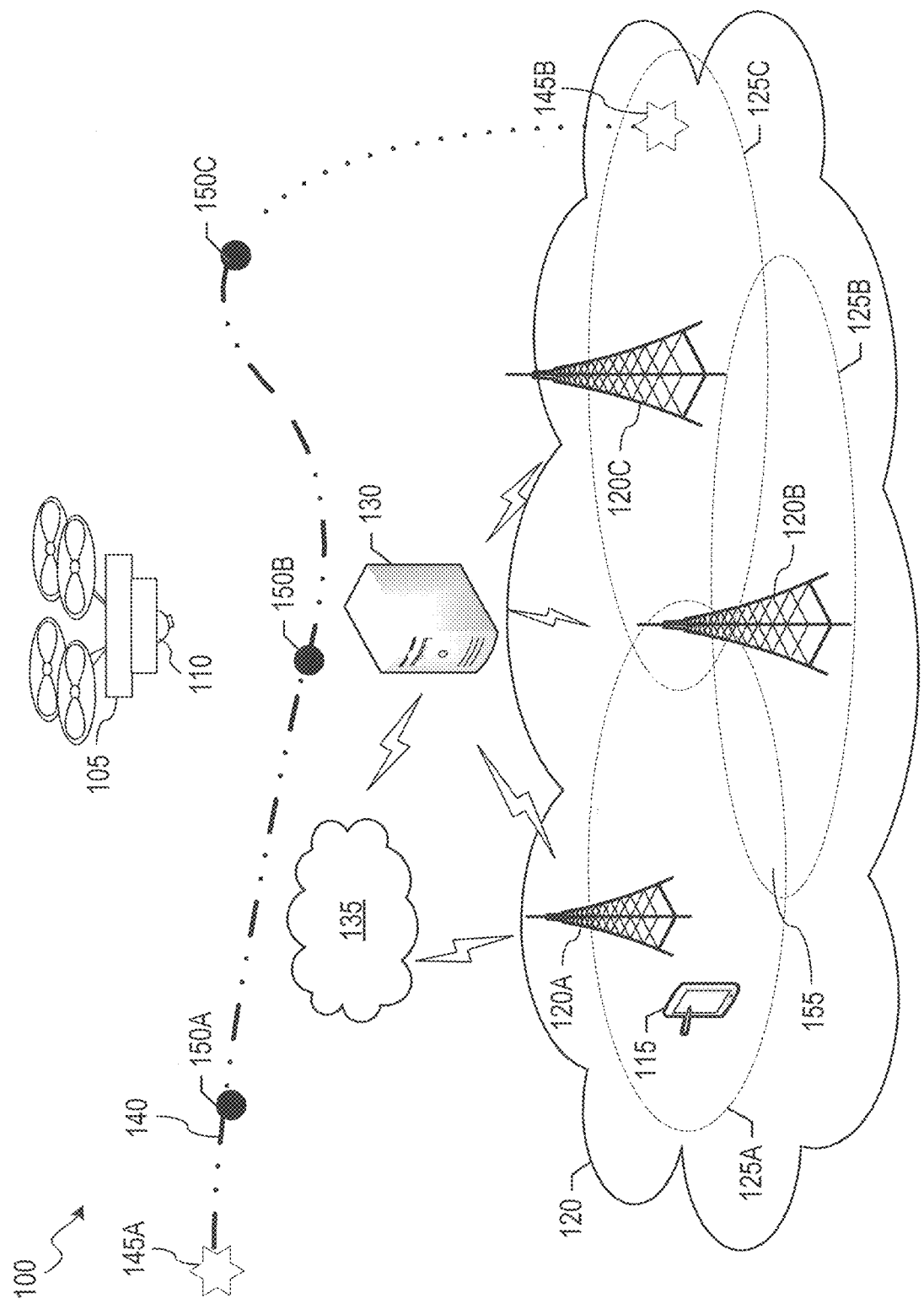
FIG. 1 illustrates an example network environment in which a system for mitigating interference impact of aerial devices may be implemented in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for facilitating interference mitigation of UEs at flight altitude during unmanned flight, such as interference mitigation of UAVs and/or other aerial devices. The UEs at flight altitude may fly on flight routes provided to the UEs and may be connected to a network (e.g., cellular network) via communication channels defined based at least on channel allocation instructions associated with the UEs. In an embodiment, for a given UE intended to be operated at flight altitude, the flight routes, channel allocation instructions, and other related information (e.g., start time, end time, speed of the flight) may be determined and generated based on flight plan information provided by an operator of the UE and geographic information. The geographic information may include obstacle information, weather information, traffic management information (e.g., air traffic management information), emergency/critical broadcast information, and/or generally any other static and dynamic information associated with the geographic regions.

Flight route, flight plan information, geographic information, and/or other information may be provided in a three-dimensional (3D) space. For example, the flight route may be defined using a set of points, with each point associated with a longitude coordinate (or range of longitude coordinates), a latitude coordinate (or range of latitude coordinates), and an altitude coordinate (or range of altitude coordinates). The altitude coordinate may be a distance (e.g., height) from a reference sea level. Similarly, a position of a device (e.g., UE, access point) may be provided in three-dimensional space. In some cases, rather than the longitude, latitude, and/or altitude coordinates, other coordinate systems by which to identify positions of points in a three-dimensional space may be utilized. In this regard, in an aspect, a position may refer to a coordinate value or range of coordinate values in three-dimensional space. In some cases, the flight route may identify potential intermediary stops by the UEs, such as stops at UAV power docking stations to charge the UEs. The UEs may be provided with autonomy as to which (if any) of the potential intermediary stops to use.

The flight route and channel allocation instructions are generated and adjusted in compliance with Federal Aviation Administration (FAA) requirements and/or other requirements, such as temporary flight restrictions (e.g., temporary event such as wildfire or security-related event, stadiums/sporting events), restricted airspace, airport-related restrictions, local flight ordinances, and/or other restrictions. Other flight recommendations and/or requirements may be taken into consideration, such as any recommended or required minimum/maximum flight altitude and/or minimum/maximum flight speed.

In various embodiments, the traffic management information may include an interference impact to the network due to the network accommodating (e.g., providing network connectivity to) UAVs, other aerial devices, and/or generally any devices at high altitudes (e.g., devices within a high-rise building). Due to a reduced path loss for line-of-sight type communication links between UEs at high altitudes and their serving access point relative to terrestrial UEs, the UEs operating (e.g., flying while communicating with the network) at high altitudes generally have a higher interference potential on a larger region surrounding each UE's serving base station than terrestrial UEs and thus generally contribute higher interference to neighboring access points than terrestrial UEs. Interference impact attributed to a UE can cause reduced access point coverage and degradation of performance for other aerial-based users and ground-based users of the network.

Interference impact may include uplink noise (e.g., also referred to as uplink interference noise) caused by UAVs and/or other UEs communicating with the network during flight in the airspace. An access point may determine that it is impacted by interference based on power received by one or more antennas of the access point. For example, for a given access point, the interference impact may be an amount of cumulative interference experienced by the access point. Each access point of the network may be exposed to uplink interference noise due to any number of factors, including an orientation of its antenna(s), surrounding environment (e.g., presence or lack of presence of obstacles, weather conditions, etc.), and distance between the access point and UEs. Energy transmitted by the UEs associated with high altitudes may spread over a wider region and be received by multiple access points. In some cases, the interference impact may be represented in terms of noise level (e.g., in dB) per physical resource block (PRB). In some cases, alternatively or in addition, the interference impact of a UE may be represented by an impact of the UE to performance characteristics such as a call drop rate, handover success rate, signal-to-noise ratio (SNR), signal-to-interference-plus-noise ratio (SINR), throughput, and/or other characteristics of one or more access points.

In some aspects, interference impact may be based on power measurements included in and/or derived from UE measurement reports provided by the UEs to their serving access points. Power measurements may include, by way of non-limiting example, received signal strength indicator (RSSI), reference signal received power (RSRP), reference signal received quality (RSRQ), SNR, and SINR. In the case of UAVs, such power measurements may be provided by the UAVs during flight of the UAVs in the airspace. In some cases, UE measurement reports may be received and analyzed by the network (e.g., associated serving access points of the network and/or backend server) to allow monitoring of interference impact and performing interference mitigation in near real time (e.g., within minutes or seconds) of receiving the UE measurement reports. The UE measurement reports may be provided with sufficiently high rate to allow such near real time control, especially during handover procedures.

For any given UE, whether the UE is at flight altitude or ground level, when the UE transmits signals to its serving access point (e.g., serving base station in a cellular network), the UE utilizes capacity of its serving access point while contributing interference to other access points that may receive the signals transmitted by the UE to the serving access point. These other access points generally include access points in geographic proximity to the serving base station of the UE. In an aspect, due to a higher interference potential associated with a UE at flight altitude (e.g., a UAV or other device at flight altitude), an area of pertinence associated with this UE encompasses this UE's serving access point and access points in geographic proximity to this UE's serving access point. In this regard, an area of pertinence may be referred to as including a group of access points or a cluster of access points. Access points in geographic proximity to the serving access point may include access points referenced as neighboring access points of the serving access point and/or access points within a certain distance of the serving access point. For example, the area of pertinence defined for and associated with such a UE may be a coverage (e.g., three-dimensional coverage) of the UE's serving access point combined with a coverage of the serving access point's neighbors. In some aspects, a definition of an area of pertinence associated with each UE at a given position may be based on measurement analytics (e.g., automated measurement analytics) using machine-learning (ML)/artificial intelligence (AI) methods. Such measurement analytics may cause adjustment of an access point's neighbor structure (e.g., represented using one or more neighbor lists) or otherwise evolve beyond a neighbor structure.

In some aspects, when multiple UAVs and/or other UEs at flight altitude are connected around the same geographic location (e.g., via onboard wireless modem devices) to a network (e.g., a cellular network), assigned radio channels are controlled by a network system to prevent these connected devices from causing excessive cumulative interference (e.g., interference above a threshold level) over extended geographic regions and/or across a large number of access points. The network system may be implemented using an aerial traffic management system, a core network, and/or generally any system utilized to facilitate network resource access scheduling and utilization by UEs. If left unmitigated, an interference above a threshold level may cause service outages, such as in the form of blocked access or dropped calls, and associated costs to cope with such service outages. The threshold level may be determined (e.g., set) based on statistical analysis of network traffic and may be different for different geographic regions (e.g., rural regions, urban regions). In some cases, interference threshold levels may be determined based on measurement analytics using ML/AI methods. In an aspect, an interference event may be detected when an interference impact is above a threshold level. An example of a threshold level may be between 2 dB per PRB and 4 dB per PRB.

Network impact associated with UAVs, other aerial devices, and/or generally any devices at high altitudes may depend in part on a number of simultaneous UE connections and may also depend on an associated cumulative throughput at a geographic location (e.g., encompassing one or more access points) and a traffic profile associated with each UE. In some aspects, one or more traffic profiles are associated with a given UE during or as part of provisioning of the UE to allow communication of the UE with the network. The network may define characteristics of a channel (e.g., bit rate, throughput, frequency, communication protocol, uplink power) to support applications associated with the traffic profile(s) of the UE. A traffic profile of a UE may identify or otherwise be associated with actions to be performed by the UE. In this regard, when provisioning the UE, the network may receive data regarding types of applications to be performed by the UE, such as package delivery, video surveillance, low definition streaming, high definition streaming, and so forth. For instance, the data may identify the UE as a drone certified for and/or associated with a first responder emergency network for performing search and rescue applications. Based on the traffic profile, the network may assign a channel having a certain quality of service to the UE to facilitate operation of the UE according to the UE's traffic profile. In some cases, a traffic profile associated to the UE may include, may be associated with, or may be indicative of, a priority level (e.g., also referred to as a priority score, priority identifier, priority value, or simply priority) associated to the UE by the network. In this regard, prioritization of the UE may occur during provisioning of the UE.

In various embodiments, for a given access point impacted by interference (e.g., above an interference threshold), UEs associated with such interference impact may be identified and one or more of these UEs may be selected for mitigation to reduce an interference impact associated with the selected UE(s). An instruction may be sent to the UEs selected for mitigation to cause adjustment of an operation of the UEs to reduce interference impact of the UEs on the network in general and the given access point in particular.

In some aspects, selection of which of the UE(s) to mitigate is based on a traffic profile associated with the UE(s). In general, each UE is associated at least with a command and control (C&C) traffic profile for facilitating telemetry. In some cases, the priority level may be a numerical identifier associated with the traffic profile (e.g., a traffic profile of priority level 1 is higher in priority than a traffic profile of priority level 2). The C&C traffic profile may be associated with a highest priority level. In these cases, selection of which of the UE(s) to mitigate may be based on a priority level associated to the UE. Table 1 provides examples of traffic profiles and associated priority levels.

TABLE 1

Examples of traffic profiles and associated priority level

| Priority level | Traffic profile |
| --- | --- |
| 1 | command and control |
| 2 | video surveillance (high/low definition) |
| 3 | streaming low definition |
| 4 | streaming high definition |
| 5 | picture low definition |
| 6 | picture high definition |

Traffic profiles may be utilized to facilitate applications such as delivery applications, surveillance applications, building construction and/or inspection applications, agricultural inspection applications, and so forth. For example, in building construction and/or inspection applications, pictures, videos, and/or other data may be communicated to facilitate analysis of territories, evaluate building structure (e.g., using visible-light images and/or thermal infrared images to locate water damage), and so forth. Although the traffic profiles of Table 1 are primarily related to communication of visual data, in some cases traffic profiles may be associated with communication of other types of data.

In some cases, mitigation may be performed on a per-traffic profile basis. In this regard, operation of a UE associated with the C&C traffic profile (e.g., telemetry) is generally left alone even if the UE is selected for interference mitigation. For example, if the UE is associated with the C&C traffic profile and a low definition streaming traffic profile, an instruction sent to the UE to cause adjustment of an operation of the UE may pertaining to the UE's low definition streaming activities and not its C&C activities.

The traffic profile may further include information and/or other associations pertaining to a service/application associated with the UE. For example, the traffic profile may identify the UE as being utilized for search and rescue applications by search and rescue entities (e.g., first responders) to perform operations associated with one or more of the traffic profiles identified in Table 1. For instance, the UE may perform operations associated with the video surveillance traffic profile and the high definition picture traffic profile. In some aspects, even if an interference event is determined to be attributable to the UE, the UE is not selected for mitigation due to the UE's utilization for search and rescue applications. In some cases, the priority level may be indicative of such information and/or other associations. For example, in a variation of Table 1, a traffic profile of priority level 2 may be associated with video surveillance (high/low definition) for search and rescue applications, whereas a traffic profile of a lower priority level (e.g., priority level 3 or lower) may be associated with video surveillance (high/low definition) for other applications.

An operation of the selected UE(s) may be adjusted to reduce its/their interference impact, while an operation of non-selected UE(s) may be left unchanged. To mitigate interference associated with a UE, an instruction may be sent (e.g., by a scheduling management system) to the UE to cause the UE to adjust one or more of a data compression associated with the UE (e.g., data size transmitted by the UE), a throughput associated with the UE, an uplink power associated with the UE, a queueing scheme associated with the UE, a different type/category associated with a communication technology, or a communication protocol/technology (e.g., Universal Mobile Telecommunications Service (UMTS)) associated with the UE. As an example, to mitigate interference, the instruction may cause the UE to decrease a data size, bit rate, and/or throughput associated with the UE's transmissions. As another example, for a picture capturing/transmission application, the queueing scheme associated with the UE may indicate a minimum amount of time between the UE capturing an image of a scene and transmission of the captured image using the network. To mitigate interference, the minimum amount of time may be set to a long duration. As another example, a UE may be migrated from communication over the network using a communication channel based on 4G Long Term Evolution (LTE) to communication over the network using a communication channel based on 4G LTE Category-M1 (e.g., also referred to as LTE CAT-M or LTE-M).

In an embodiment, a determination of whether to, and in some cases how to, perform interference mitigation may be based on the network (e.g., set by a network provider). The network may specify interference thresholds, performance thresholds, SINR, SNR, KPIs, and/or generally any set of conditions that need to be maintained (e.g., achieved, exceeded, not exceeded, etc.) even when UAVs and/or other aerial devices are being accommodated by the network. For example, the network may indicate that an interference impact to any access point be below a threshold interference level (e.g., in dB per PRB), a throughput rate be above a threshold throughput rate (e.g., a minimum throughput rate to maintain quality of service), and/or other conditions.

In various embodiments, the network may handle aerial devices differently from terrestrial devices. In some aspects, the network may perform interference mitigation primarily on aerial devices (e.g., since aerial devices are generally associated with higher interference potential on the network than terrestrial devices and/or since the network is generally intended and optimized for use by terrestrial devices). The network may avoid performing interference mitigation on terrestrial devices until only after the aerial devices (if any) have been mitigated. In this regard, the network may identify a UE as being an aerial device or a terrestrial device, such as during provisioning of a UE. A UE may be associated with an indication (e.g., identifier, flag) as to whether the UE is an aerial device (e.g., UAV) or a terrestrial device. In some cases, the indication may be a previous identifier (e.g., unique identifier) associated by the network with the UE and may tie the UE to a subscribed UE profile. Such association between the network and the UE may be part of a provisioning of the UE.

In some aspects, the network may determine that although an indication identifies a UE as a terrestrial device the UE should still be considered an aerial device for purposes of interference mitigation. In this regard, such a terrestrial UE may be selected for interference mitigation. For example, although the terrestrial UE is a device expected to be operated at or near ground level (e.g., mobile phone, tablet, etc.) and thus may be identified by the network (e.g., during provisioning) as a terrestrial device, the terrestrial UE may be mounted to an aerial device (e.g., UAV) and thus the terrestrial UE affects the network as if it were an aerial device. In an aspect, the network may determine that the terrestrial UE is to be treated as if it were an aerial device (e.g., UAV) based on measurement reports associated with the terrestrial UE. In this regard, the measurement reports may include power measurements that indicate an amount of power the terrestrial UE receives from its serving access point and possibly other access points. When the network determines that the terrestrial UE receives a non-negligible amount of power from a large number of access points and/or transmits a non-negligible amount of power that is received by a large number of access points, which are generally atypical of a terrestrial UE at or near ground level (e.g., due to obstructions and associated path loss), the network may determine (e.g., assume) that the terrestrial UE is operating at flight altitude and effectively acts as a UAV. In some cases, terrestrial devices that should be handled as if they were aerial devices may be referred to as rogue drones.

In some cases, the network may distinguish between a terrestrial UE operating effectively as an aerial device at flight altitude and a terrestrial UE operating at high altitude in a high-rise building or other structure at high altitude. In these cases, for example, the UE operating at high altitude in a high rise may be associated with higher path loss and lower interference impact on the network, such as due to signals from the UE needing to pass through a wall of the high-rise building, objects within and/or outside the high-rise building, and/or generally anything that contributes to loss between the UE and its serving access point and other access points. As such, the UE operating at high altitude in a high-rise building may be treated similar to a terrestrial UE at or near ground level. In this regard, classification of a terrestrial UE may be based on the measurement reports. In an embodiment, the network may perform interference mitigation primarily on the aerial devices and rogue drones, whereas interference mitigation is not performed on terrestrial UEs at or near ground level and terrestrial UEs operating at high altitude in a high-rise building or other structure until after the aerial devices (if any) and rogue drones (if any) have been mitigated. In general, interference associated with the terrestrial UEs at or near ground level and terrestrial UEs operating at high altitude in a high-rise building or other structure is lower than aerial UEs and rogue drones.

Although the foregoing is described with reference to aerial devices and terrestrial devices, the network may also distinguish between aerial devices and naval-based devices, terrestrial devices and naval-based devices, and generally distinguish between various other types and combinations of devices as appropriate based on applications. In some cases, classification of a UE and how the network handles each type of UE may be based on interference impact associated with the UE. In this regard, classification of UEs (e.g., as aerial devices, rogue drones, terrestrial devices) into various types may be based on relative effects (e.g., relative interference potential) experienced by the network due to accommodating each type of UE on the network. In an aspect, UEs at flight altitude may refer to aerial devices as well as rogue drones (e.g., terrestrial devices that should be handled as if they were aerial devices). In some aspects, classification of the UEs may be based on measurement analytics using ML/AI methods.

Thus, using various embodiments, the techniques mitigate interference events due to accommodation of, for example, aerial UEs (e.g., including rogue drones) by the network to facilitate maintaining/sharing of network connectivity (e.g., network resources) to UEs and thus facilitate coexistence of aerial UEs and terrestrial UEs at or near ground level. Interference impact may be mitigated in a wider geographic location corresponding to areas of pertinence associated with UEs connected to the access points of the network. In an aspect, a UAV's network resource access and utilization may be scheduled on a per region level (e.g., scheduling takes into consideration network impact of the UAV on a cell tower cluster level, square-mile level, or other region level) in addition to a per cell level in order to control and limit interference on extended regions. An area of pertinence associated with a UAV is adjusted as the UAV moves (e.g., through the airspace) and/or connects to different serving access points. In some cases, a series of progressive mitigation actions may be performed on the UEs to mitigate interference events. For example, for a given interference event attributable to at least two UAVs, a first UAV associated with a relatively low priority score (e.g., indicated by its traffic profile) compared to a second UAV may be selected for mitigation during a first iteration and, if the interference event has not been mitigated, the second UAV associated with a lower priority score than remaining UAVs may be selected for mitigation during a second iteration. As another example, if the first and second UAVs have the same priority score, the UAV associated with a higher interference impact may be selected for mitigation.

Furthermore, in some aspects, the flight routes can be coordinated to reduce the possibility of collisions (e.g., between different UEs or between a UE and an obstacle), maintain wireless connection of the UEs to a network during flight of the UEs, and/or meet quality of service parameters for various applications (e.g., ground-based and/or aerial-based applications). For example, quality of service parameters for delivering packages may include reliability in meeting a deadline (e.g., time at which to reach the destination point) and/or maintaining the packages in good condition. In this regard, the flight routes and channel allocation instructions can be coordinated to allow air traffic to be better distributed throughout the airspace (e.g., to reduce traffic congestion and/or collisions) and/or to allow wireless traffic to be better distributed (e.g., to reduce overloading of some access points, underutilization of other access points, and interference impact due to UEs at flight altitude), thus facilitating more efficient use of the airspace and the network that is supplemented by mitigation of detected interference events.

The implementation of the flight routes may be supplemented by onboard sensors of the UEs and/or broadcast messages provided by access points of the network. For instance, the onboard sensors of the UEs may be operated to maintain a minimum distance separation between the UEs and other UEs, and/or between the UEs and obstacles, e.g., such as minimum distance separation requirements or recommendations from FAA.

The network may include a wide area network (WAN), such as a cellular-based WAN. In some aspects, base stations of a cellular network are generally those base stations utilized with UEs at ground level or near ground level, such as vehicles (e.g., cars) and mobile phones operated at or near ground level. For example, position and orientation (e.g., tilt) of antennas of the base stations may be configured to provide higher signal strength for devices below these antennas. In this regard, the base stations may be designed with a main antenna pattern that primarily encompasses a ground region. Furthermore, at lower altitudes, obstructions such as buildings and trees may help prevent signals from multiple base stations from reaching the vehicles and devices at or near ground level with signal strengths that cause non-negligible interference.

Coverage regions of a cellular network are generally designed (e.g., by the provider) for ground level UEs, such that ground level UEs benefit from these designed coverage regions. For instance, a coverage region of a base station may be designed such that the base station may be utilized as a serving base station for ground level UEs, with the ground level UE receiving signals from and/or transmitting signals to a main lobe of the serving base station. High altitude UEs may contribute interference due to antenna sidelobe coverages generally not utilized by terrestrial UEs.

When radio modules, such as 3G, 4G, 4G LTE, 5G, other 3GPP-based radio modules, and/or other radio modules, are placed at flight altitude, such as 300 feet or 400 feet, the line of sight propagation of signals from multiple base stations may be received by the radio modules and cause interference. The different antenna patterns (e.g., different vertical antenna patterns) of the base stations at different radio frequencies (e.g., in different frequency bands) and/or at different altitudes may cause degradation of communicated signals, including signals associated with application data and C&C functions. In addition, higher altitudes generally have fewer obstructions than at ground level, and thus more signals may reach the devices/vehicles at higher altitudes and cause interference relative to devices/vehicles at ground level. The aerial devices/vehicles (e.g., UAVs) may include antennas to receive radio signals from one or more base stations, such as a closest base station and/or a base station associated with higher signal strength. However, at altitudes above ground level, such as 20 feet or more above ground level, the aforementioned issues become apparent to radio signals received by the aerial devices/vehicles.

In the case of cellular networks, since cellular networks are generally designed for (e.g., optimized for) terrestrial UEs, such as mobile phones, any accommodation of UAVs by cellular networks may take into consideration minimizing impact on terrestrial UE connection quality due to such accommodation of UAVs. In this regard, for instance, for a given UAV, an operation of the UAV may be adjusted to reduce interference impact of the UAV on the cellular network.

In some aspects, although the UEs are not communicating with base stations dedicated to aerial communication, the generation, management, and implementation of the flight routes may facilitate flight of the UEs and maintaining of cellular connectivity during flight of the UEs without disrupting service, for example, to UEs at ground level. In an aspect, flight of the UEs and maintaining of cellular connectivity may be facilitated with minimal or no changes to structural features, such as the housing, antennas, and/or other components, such that the use of the cellular network (e.g., the base stations) with the UEs at ground level are not affected by the UEs at flight altitude.

Although the description of the present disclosure is made with respect to cellular networks and UAVs, the techniques described herein may be applied to any wireless networks and any UEs capable of establishing connectivity in such wireless networks. Interference events of such UEs may be determined and mitigated during navigation (e.g., on the streets, in the air, etc.) of the UEs. In some cases, such UEs may be, may include, or may be a part of (e.g., installed within, mounted thereon) unmanned vehicles or manned vehicles. Such vehicles may be land-based vehicles, naval-based vehicles, and/or aerial vehicles. In some aspects, alternatively and/or in addition, the UEs may wirelessly communicate with other devices using other wireless technology, such as Institute of Electrical and Electronics Engineers (IEEE) 802.11 standard, Bluetooth® standard, ZigBee® standard, and/or other wireless standards; infrared-based communications; optical-based communications; and/or other appropriate communication standards and/or protocols.

FIG. 1 illustrates an example network environment 100 in which a system for mitigating interference impact of aerial devices (e.g., during unmanned flight) may be implemented in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

The network environment 100 includes a UAV 105, a terrestrial UE 115, a radio access network (RAN) 120, an aerial traffic management system 130, and a core network 135. Base stations 120A-C of the RAN 120 are shown in FIG. 1, although the RAN 120 may include additional base stations. In other cases, a RAN may include fewer or more base stations. The UAV 105, terrestrial UE 115, RAN 120 (e.g., base stations 120A-C), aerial traffic management system 130, and core network 135 may be in communication directly or indirectly. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events. In addition, communication with the RAN 120 may include communication with one or more of the base stations 120A-C and/or other components (e.g., base stations) of the RAN 120 not shown in FIG. 1. Similarly, communication with the core network 135 may include communication with one or more components of the core network 135, such as communication with a mobility management entity (MME) of the core network 135.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. The cellular network may be provided by a mobile network operator. In FIG. 1, the cellular network includes the RAN 120, aerial traffic management system 130, and/or core network 135. In some cases, the aerial traffic management system 130 may be provided by another party. In some examples, the network environment 100 may be additionally or alternatively implemented to form part of a satellite communication network, microwave radio network, and/or other wireless networks.

The UAV 105 may include, may be a component of, and/or may be referred to as, a UE. The UAV 105 may include a flight control unit, communication unit, and payload unit. The flight control unit may be configured to facilitate aerial navigation of the UAV 105, e.g., take off, landing, and flight of the UAV 105. The flight control unit may include any appropriate avionics, control actuators, and/or other equipment, along with associated logic, circuitry, interfaces, memory, and/or code. Additionally, the flight control unit may include a controller that receives flight route information from one or more sources, including a memory and/or an external controller (e.g., set instructions from a service provider and/or in-flight navigation/instructions from an operator) that operates the UAV 105.

The communication unit may include one or more radio transceivers (e.g., antennas) along with associated logic, circuitry, interfaces, memory, and/or code that enable communications, e.g., with the terrestrial UE 115, RAN 120 (e.g., one or more of the base stations 120A-C), aerial traffic management system 130, and/or core network 135 via wireless interfaces and using the radio transceivers. In FIG. 1, the radio transceivers of the UAV 105 include an antenna 110, which may be omnidirectional or directional. The antenna 110 may be utilized to radiate and/or receive power uniformly in all directions (e.g., omnidirectional antenna), or one or more desired directions (e.g., directional antenna) to allow better performance (e.g., higher signal strength) in the desired direction(s), such as through higher gain and directivity and reduced interference due to signals from sources deviating from the desired direction(s). In this regard, signal strength of command/control links and/or application data channels may be improved, and/or interference of signals from different base stations may be reduced through the use of a directional antenna. The antenna 110 may be contained within a housing of the UAV 105, or disposed (e.g., mounted) outside a housing of the UAV 105 as an attachable and/or removable antenna. In some cases, the antenna 110 may be movable along and/or rotatable about one, two, or three axes. In other cases, the antenna 110 may be fixed (e.g., not movable and not rotatable). In some cases, the UAV 105 may include multiple antennas.

The UAV 105 may measure signal strength, signal diagnostics, and/or interferences of signals from the base stations via signals received by the antenna 110 and/or other antenna(s) (e.g., omnidirectional and/or directional antenna) of the UAV 105. The signal strength may be, or may be based on, measures such as RSSI, RSRP, RSRQ, SNR, SINR, and/or other measures. Such measures of signal strength may be computed by the UAV 105 on signals received from a serving base station of the UAV 105 and surrounding base stations of the serving base station, which may include base stations referenced as neighbor base stations of the serving base station. In an aspect, signal strength may be referred to as signal quality, signal level, or signal power. A higher signal strength is generally associated with better reception. In addition, the antenna 110 and/or other antenna(s) may be used to exchange messages with the RAN 120 (e.g., one or more of the base stations 120A-C) to analyze message reception, clarity, and/or other measurements, as well as detect issues with messaging due to interference.

In an embodiment, the communication unit may send and/or receive information over a cellular technology network (e.g., 3G, 4G, 5G, and/or other 3GPP-based cellular network), such as to and/or from the terrestrial UE 115, one or more of the base stations 120A-C, the aerial traffic management system 130, and/or the core network 135. In some aspects, the UAV 105 may wirelessly communicate (e.g., via the antenna 110 and/or other antennas) with other devices using other wireless technology, such as IEEE 802.11 standard, Bluetooth® standard, ZigBee® standard, and/or other wireless standards; infrared-based communications; optical-based communications; and/or other appropriate communication standards and/or protocols. In some cases, the UAV 105 may communicate via the antenna 110 using LTE Category-M1 and/or other Internet of Things (IoT)-based communication protocols/technologies. In some cases, the UAV 105 may be configured to communicate with another device using a proprietary wireless communication protocol and interface.

In addition, the communication unit of the UAV 105 may include suitable logic, circuitry, interfaces, memory, and/or code that enable wired communications, e.g., with the terrestrial UE 115, RAN 120, aerial traffic management system 130, and/or core network 135. In this regard, the UAV 105 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, the UAV 105 may utilize wired connections when at or near ground level, such as a wired connection between the UAV 105 and terrestrial UE 115 for facilitating testing and/or calibration/setup of the UAV 105.

The payload unit may be configured to implement features supported by the UAV 105 and facilitate implementation of such features. The payload unit may include any equipment and associated logic, circuitry, interfaces, memory, and/or code. The payload unit may include a global positioning system (GPS) that provides a current position of the UAV 105 (e.g., using three coordinates). The position information from the GPS, together with position information of devices in communication with the UAV 105, may allow the UAV 105 to direct a directional antenna to, or to a vicinity of, one or more of these devices. By facilitating establishing and maintaining of connections with higher signal strength, the UAV 105 may facilitate implementation of various features supported by the UAV 105.

Depending on an application(s) of the UAV 105, the payload unit may include one or more onboard sensors, which may be contained within a housing of the UAV 105 or mounted outside the housing of the UAV 105. Such applications of the UAV 105 may be, may include, or may be performed as a part of missions to be performed by the UAV 105. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras, video cameras); acoustic sensors; and/or other types of sensors, or combination thereof. Some sensors may be utilized to prevent collisions and may include other processing features for a collision avoidance system. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g., the object may be secured within a housing of the UAV 105. The payload unit may also contain rechargeable power sources, such as a rechargeable solar battery and associated solar charging panel or photovoltaic charging source.

The terrestrial UE 115 may be, and/or may include, a mobile phone, a personal digital assistant (PDA), a tablet device, a computer, or generally any device that is operable to communicate wirelessly (e.g., via cellular standards using antennas) with the UAV 105, RAN 120, aerial traffic management system 130, and/or core network 135. For example, the terrestrial UE 115 may communicate wirelessly over the cellular network by using the base station 120A as its serving base station. In an aspect, the terrestrial UE 115 may be a remote control used by an operator (e.g., a human) to provide commands to the UAV 105 when the UAV 105 is within line of sight of the terrestrial UE 115. For example, the operator may issue commands via the terrestrial UE 115 to instruct the UAV 105 to fly in certain directions and/or at certain speeds and/or to perform activities such as picking up or delivering an object. In an aspect, the line of sight of the terrestrial UE 115 may refer to a coverage area or coverage volume within which signals transmitted by the terrestrial UE 115 to the UAV 105 can be received by the UAV 105 with sufficient signal strength. In some cases, the sufficient signal strength may be a preset threshold level (e.g., SNR level), which may be set during a setup/calibration stage for associating the UAV 105 with the terrestrial UE 115.

In an embodiment, the UAV 105 and the terrestrial UE 115 may wirelessly communicate with each other using wireless standards; cellular standards, and/or other cellular standards; infrared-based communication; optical-based communications; and/or other appropriate communication standards and/or protocols. In some cases, the UAV 105 may communicate with the terrestrial UE 115 using LTE Category-M1, other IoT-based communication protocols/technologies, and/or proprietary wireless communication protocol and interface. In some cases, the UAV 105 and the terrestrial UE 115 may be configured to communicate over a wired link (e.g., through a network router, switch, hub, or other network device) for purposes of wired communication, e.g., such as during testing, setup, and/or calibration stages between the UAV 105 and the terrestrial UE 115. The UAV 105 may be at or near ground level to receive a wired connection. The UAV 105 and the terrestrial UE 115 may be configured to interface with a wired network, such as via an Ethernet interface, power-line modem, DSL modem, PSTN modem, cable modem, proprietary wired communication protocols, and/or other appropriate components for wired communication.

Although a single user device (e.g., the terrestrial UE 115) is shown in FIG. 1, multiple user devices (e.g., multiple devices owned by or otherwise accessible to the same operator) may be utilized to communicate with the UAV 105. For example, the same operator may communicate with the UAV 105 using the terrestrial UE 115 (e.g., a tablet device) and/or a mobile phone. Furthermore, although the terrestrial UE 115 is described as being a remote controller of the UAV 105, in a more general case, the terrestrial UE 115 may be any device at or near ground level that may or may not have any association with the UAV 105.

One or more of the base stations 120A-C of the RAN 120 may include, may be a component of, and/or may be referred to as, a cell, a Node B (NB), an Evolved Node B (eNodeB or eNB), or a Home eNB (HeNB). One or more of the base stations 120A-C include suitable logic, circuitry, interfaces, memory, and/or code that enable communications, e.g., with the terrestrial UE 115, one of the other base stations 120A-C, the aerial traffic management system 130, and/or the core network 135 via wireless interfaces and utilizing one or more radio transceivers (e.g., antennas). In an aspect, the base stations 120A-C may transmit (e.g., broadcast) messages that, if received and processed by the UAV 105, provide information to facilitate navigation of the UAV 105 in the airspace. In some cases, the messages transmitted by the base stations 120A-C may be based on information that the base stations 120A-C receive from the core network 135 and/or aerial traffic management system 130. In some cases, one or more of the base stations 120A-C may be mobile (e.g., mobile base stations at ground level, mobile base stations at flight altitudes, mobile naval-based base stations, etc.).

The base stations 120A-C may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, the base stations 120A, 120B, and 120C have nominal coverage area 125A, 125B, and 125C, respectively, at ground level or near ground level. The coverage area of a base station may be different in different environments, at different altitudes, at different times, and at different frequency bands. When altitudes are taken into consideration, the coverage area provided by the base stations 120A-C may more appropriately be referred to as a coverage volume, with different coverage areas at different altitudes. In an aspect, a coverage area of a base station may be larger at flight altitudes (e.g., 400 feet) than at lower altitudes such as ground level, due to fewer obstructions at flight altitudes for example. As used herein, the coverage area and coverage volume may be referred to more generally as a coverage region, where the region may be two-dimensional (e.g., coverage area) or three-dimensional (e.g., coverage volume).

The core network 135 may include components (e.g., authentication, authorization, and account (AAA) server, MME, etc.) for managing connections of ground-based UEs (e.g., the terrestrial UE 115) and/or aerial-based UEs (e.g., the UAV 105) to the RAN 120, aerial traffic management system 130, core network 135, and/or other cellular networks or components thereof (e.g., base stations of other RANs), and process information communicated using these connections. For example, the core network 135 may include and/or may be in communication with, a mobile telephone switching office (MTSO). The core network 135 may include components, such as an MME and/or other components, for authenticating UEs to the cellular network (e.g., authenticating UEs to the RAN 120 and core network 135) and for operating in conjunction with the RAN 120 to determine radio resource management strategy to facilitate connectivity of UEs to the cellular network.

The core network 135 includes suitable logic, circuitry, interfaces, memory, and/or code that enable communications, e.g., with the RAN 120 (e.g., one or more of the base stations 120A-C), aerial traffic management system 130, and/or one or more UEs (e.g., the UAV 105, the terrestrial UE 115), via wireless interfaces and utilize one or more radio transceivers. In some cases, the core network 135 or components thereof may enable communications with the RAN 120 and aerial traffic management system 130 via wired interfaces.

The aerial traffic management system 130 may facilitate flight of UAVs and/or other aerial devices at flight altitude and maintaining connectivity of such vehicles/devices to the cellular network (e.g., the RAN 120 and core network 135). The aerial traffic management system 130 includes suitable logic, circuitry, interfaces, memory, and/or code that enable communications, e.g., with the RAN 120 (e.g., one or more of the base stations 120A-C), core network 135 (e.g., MME of the core network 135), and/or one or more UEs (e.g., the UAV 105, the terrestrial UE 115), via wireless and/or wired interfaces and utilize one or more radio transceivers.

In some aspects, the aerial traffic management system 130 (or component(s) thereof) may be a part of the core network 135 that is dedicated to handling UAVs and/or other aerial devices (e.g., authentication, profile information access and/or storage, etc.). Alternatively and/or in addition, the aerial traffic management system 130 (or component(s) thereof) may be separate from the core network 135. For instance, the aerial traffic management system 130 may be provided by another party. In this regard, even when provided by different parties, the aerial traffic management system 130 may share information with the core network 135, and vice versa, to facilitate management of UEs associated with (e.g., connected to, provided connectivity by) the cellular network. For explanatory purposes, operations described as being performed by the aerial traffic management system 130 may be performed at least partially, performed alternatively, and/or performed in addition at the core network 135, and/or vice versa.

In an aspect, the core network 135 and/or aerial traffic management system 130 may be, may include, or may be a part of, a server or server farm that can generate and distribute information to the terrestrial UE 115 and/or the RAN 120. In some cases, different components (e.g., devices) of the core network 135 and/or aerial traffic management system 130 may be distributed across different geographic locations and/or may manage UEs (e.g., ground-based, aerial-based) and base stations in different geographic locations.

The base stations 120A-C of the RAN 120 may be in communication with the core network 135 and/or the aerial traffic management system 130 through a backhaul network. A UE (e.g., the UAV 105, the terrestrial UE 115) may communicate with the core network 135 and/or the aerial traffic management system 130 via a serving base station selected by the UE, and the core network 135 and/or the aerial traffic management system 130 may communicate with the UE via the UE's serving base station. The core network 135 and/or aerial traffic management system 130 may be in direct communication with one or more of the base stations 120A-C or in communication with one or more of the base stations 120A-C through one or more intermediary base stations.

In some aspects, the base stations 120A-C may individually store or otherwise have access to a neighbor list that includes neighboring relationships of a base station with other base stations. The neighbor list may be an automatic neighbor relation (ANR) table. In some cases, the neighbor relationships may be based on measurement reports from UEs (e.g., the UAV 105). The UEs may transmit (e.g., periodically, aperiodically) the measurement reports to their respective serving base stations. The serving base stations may transmit (e.g., periodically, aperiodically) the measurement reports and/or information related to (e.g., derived from) the measurement reports to the aerial traffic management system 130 and/or core network 135. In some cases, the aerial traffic management system 130 and/or the core network 135 may retrieve the measurement reports and/or associated information from the serving base station (e.g., stored locally at the serving base station and/or at a remote memory associated with the serving base station).

The measurement reports may include signal strengths (e.g., RSSI, RSRP, etc.) of signals from the base stations 120A-C that are received and measured by the UEs and/or information derived based on the signal strengths. For example, the UAV 105 may measure the signal strengths of signals received by the UAV 105 from the serving base station, neighbor base stations of the serving base station, and/or other base stations, and the UAV 105 may include the signal strengths in the measurement reports. Similarly, the terrestrial UE 115, other aerial UEs, and/or other terrestrial UEs may provide measurement reports to their serving base stations. In some cases, the measurement reports of a UE may include information pertaining to signal strength of downlink PRBs, and/or other signal measurements, of the UE's serving base station and neighbor base stations of the serving base station.

In an aspect, the core network 135 and/or aerial traffic management system 130 may generate, store, maintain, and/or update the neighbor lists. For example, the neighbor list for the base station 120A may be generated by the core network 135 based on measurement reports provided by UEs to the base station 120A and relayed by the base station 120A to the core network 135. Alternatively or in addition, the core network 135 may generate the neighbor list based on signal strength statistics, such as RSRP or RSSI variances, average SNR, average SINR, and/or generally any other signal strength statistics computed based on one or more signals received and measured by the UEs. The statistics may be computed by the UEs, the base stations 120A-C, the aerial traffic management system 130, and/or the core network 135. In some cases, based on the measurement reports, the aerial traffic management system 130 and/or the core network 135 may determine whether a terrestrial UE is to be treated as if it were an aerial device and/or distinguish between a terrestrial UE operating effectively as an aerial device at flight altitude and a terrestrial UE operating at high altitude in a high-rise building or other structure.

If the base station 120A receives comparative signal strengths (e.g., on measurement reports) from the UAV 105 for the base stations 120A and 120B, the base station 120A, aerial traffic management system 130, and/or core network 135 may determine that the base stations 120A and 120B can be referenced as neighboring base stations on the neighbor list. In an aspect, multiple neighbor lists may be generated for each base station. For example, each base station may be associated with at least two neighbor lists. One neighbor list for the base station 120A may be generated based on measurement reports from UEs at ground level (or near ground level), whereas a different neighbor list may be generated based on measurement reports from UEs at flight altitudes (e.g., UAVs). In some cases, different neighbor lists may be generated for different flight altitudes.

In some cases, a neighbor list may include position information (e.g., longitude, latitude, altitude) of each base station on the neighbor list and/or otherwise provide information indicative of the position information of each base station. The position information may allow the UAV 105 to point a directional antenna (e.g., if any) at its serving base station to allow improved reception and transmission of signals, and/or scan for possible serving base stations using a directional antenna. In some cases, the neighbor list may include other information (e.g., obstacle information, weather information, etc.) for each base station on the neighbor list.

In one or more embodiments, the RAN 120, the aerial traffic management system 130, and/or the core network 135 receives, stores, analyzes, and/or processes data to determine (e.g., monitor) an interference impact of UAVs and/or other aerial devices on the cellular network (e.g., the RAN 120, aerial traffic management system 130, and/or core network 135). The interference impact may be indicative of the effect of accommodating (e.g., expending resources on) the UAVs and/or other devices at flight altitude by providing the UAVs and/or other devices connectivity to the cellular network, which is generally designed for use by devices at ground level. The interference impact may be included in and/or derived from the measurement reports received from UEs that utilize the cellular network, including terrestrial UEs and aerial UEs. In some cases, each of the base stations 120A-C may determine interference that it experiences based on power from UEs received by the base station's one or more antennas.

For flight of the UAV 105 within a portion of the airspace (e.g., air corridor or portion thereof), the interference impact associated with the UAV 105 may be based on measurement reports provided by the UAV 105 to its serving base station during flight within the portion of the airspace. The interference impact may be based on noise (e.g., uplink noise) experienced by base stations of the RAN 120 when a UE at flight altitude is flying in the airspace. By way of non-limiting example, the noise caused by the UAV 105 may be based on transmission power used by the UAV 105 for data transmissions to its current serving base station, received signal power of signals (e.g., RSRP and/or RSRQ values) received by the UAV 105 from the current serving base station, and received signal power of signals received by the UAV 105 from surrounding base stations associated with the current serving base station. In an aspect, the surrounding base stations may be, or may include, base stations designated as neighboring base stations of the current serving base station (e.g., on an ANR table) of the current serving base station). In some cases, the interference impact to the cellular network associated with (e.g., attributed to) a UE when the UE is connected to the cellular network via a serving base station may be utilized to determine neighbor base stations of the serving base station.

As an example, for the UAV 105, the aerial traffic management system 130 may determine interference impact based on information pertaining to uplink and downlink PRB signal quality, uplink and downlink PRB utilization, and/or other information of a serving base station of the UAV 105, the serving base station's neighbor base stations, and/or other base stations. The information may be measured by the UAV 105 and provided by the UAV 105 in the measurement reports. The UAV 105 may also identify (e.g., in the measurement reports) the location (e.g., longitude, latitude, altitude) and time at which the UAV 105 performed the measurements. Such information may be utilized with information in measurement reports from other UEs to determine the interference impact to the cellular network (e.g., to PRBs associated with the RAN 120) that can be attributed to (e.g., correlated to) the cellular network accommodating the UAV 105.

In an embodiment, the aerial traffic management system 130 may determine an interference impact associated with accommodation of UEs by the cellular network in each portion of the airspace. In this case, for each portion of the airspace, the interference impact may be based on noise (e.g., uplink noise) experienced by surrounding base stations (e.g., neighbor base stations) of a serving base station of the RAN 120 when the UEs are connected to the serving base station while flying in the portion of the airspace. The interference impact may be represented in terms of noise level per PRB. In some aspects, in a specific portion of the airspace, the aerial traffic management system 130 may determine correlations between levels of uplink noise on a non-serving base station and associated cause (e.g., UAVs operating within the specific portion of the airspace) based on non-serving base station PRB noise level analysis and uplink PRB utilization of UEs flying in the specific portion of the airspace. Different portions of the airspace may experience different interference impact associated with accommodation of UEs operating in the portions of the airspace.

Using various embodiments, the aerial traffic management system 130 may coordinate and monitor traffic associated with UEs flying in the airspace as well as network traffic associated with servicing such UEs. Such coordination and monitoring may be encompass a wider geographic location (e.g., using area of pertinence) in addition to a single site footprint. As such, admission and congestion control, such as call admission control, may be implemented with consideration at a region level as well as a cell level. In this regard, the aerial traffic management system 130 may facilitate accommodation of UEs at flight altitude in the cellular network (e.g., typically optimized for UEs connecting at ground level) while monitoring and controlling impact of such accommodation on UEs that are connecting to the cellular network at or near ground level. In some cases, connectivity to the cellular network and/or flight route generation/management may be provided to subscribed UEs only. In other cases, cellular connectivity and/or flight route generation may be provided to subscribed UEs as well as unsubscribed UEs (e.g., with an additional fee for unsubscribed UEs).

In various embodiments, the RAN 120 (e.g., the base stations 120A-C) detects for interference events (e.g., based on power received by one or more antennas of the base stations 120A-C). In response to a base station of the RAN 120 detecting an interference event at the base station, the base station provides an indication (e.g., a flag) that an interference event has been detected at the base station to the aerial traffic management system 130 and/or the core network 135. In response to the indication, the aerial traffic management system 130 and/or the core network 135 may identify UEs associated with the detected interference event, select a UE for interference mitigation, and provide an instruction to the selected UE (e.g., via a serving base station of the selected UE) to cause adjustment of the UE to mitigate the detected interference event. An instruction to a UE may include an instruction to cause the UE to adjust one or more of a data compression associated with the UE, a throughput associated with the UE, an uplink power associated with the UE, a queueing scheme associated with the UE, a different type/category associated with a communication technology, or a communication protocol/technology associated with the UE.

In addition, the aerial traffic management system 130 may generate and coordinate flight routes of UAVs and/or other aerial devices to allow air traffic to be distributed at flight altitude (e.g., to reduce traffic congestion and/or collisions) and/or cellular traffic to be distributed (e.g., to reduce overloading of some base stations and underutilization of other base stations), thus facilitating more efficient use of the airspace and the cellular network. In some cases, the distribution of the cellular traffic may help monitor and control interference impact on the cellular network associated with the UAVs and/or other aerial devices in the airspace.

The aerial traffic management system 130 may generate communication channel allocation instructions (e.g., also referred to as radio channel allocation instructions or physical channel allocation instructions) and provide these instructions to the RAN 120. The instructions may also be referred to as options or guidelines. The channel allocation instructions may indicate one or more frequency bands, bit rate range (e.g., minimum and/or maximum allowed bit rate), an uplink power, a communication protocol, and/or type/category of LTE technology (e.g., LTE Category M) to be used by the RAN 120 to define a communication channel (e.g., physical communication channel) for the UAV 105 for connecting the UAV 105 to the cellular network.

The channel allocation instructions are used by the base stations 120A-C and/or any base stations of the RAN 120 to assign a communication channel with the UAV 105 when the UAV 105 selects a base station as its serving base station during flight on a flight route. For example, when the UAV 105 selects the base station 120A as its serving base station, the base station 120A may assign a communication channel to the UAV 105 based on radio resource management of the base station 120A within bounds identified by the aerial traffic management system 130 in the channel allocation instructions. In some aspects, different portions of the airspace may be associated with different channel allocation instructions, such as to account for differences in the distribution of available and/or utilized channel resources of the RAN 120 for connecting to UAVs flying in the different portions.

With reference to FIG. 1, flight beyond the line of sight of the UAV 105 may be facilitated through a pre-programmed flight route provided by the aerial traffic management system 130. A flight route 140 may be defined by a set of points, including a starting point 145A, destination point 145B, and points 150A-C labeled in FIG. 1, at which the UAV 105 is located, has been located, or is expected to be located. Each point may be associated with a set of three-dimensional coordinates (e.g., longitude or longitude range, latitude or latitude range, altitude or altitude range). As an example, in delivery applications, the starting point 145A may be a warehouse at which the UAV 105 is provided with the payload (e.g., a package) to be delivered and the destination point 145B may be, for example, a customer's house, a post office or courier service office, or other destination from which the payload is to be routed to the customer. As another example, in video streaming applications, the UAV 105 may capture and transmit video data as the UAV 105 flies from the starting point 145A to the destination point 145B.

The flight route 140 may include changes in latitude, longitude, and/or altitude throughout the route, as shown in FIG. 1 for example. In this regard, the aerial traffic management system 130 may determine that a shortest path between two base stations may not be feasible (e.g., due to temporary or permanent obstacles) and/or may not be associated with efficient air traffic (e.g., in presence of other UAVs). For instance, in some cases, while the shortest path may be implemented in geographic areas in which air traffic is sparse, the shortest path is not necessarily optimal for cases in which the air traffic is heavy with UAVs of different sizes, shapes, speeds, and/or applications. For example, the aerial traffic management system 130 may determine that a smoother (e.g., fewer turns and/or fewer changes in altitude) but lengthier route would be preferable to a shorter distance route for a UAV that is carrying a fragile payload (e.g., customer package, fragile equipment), e.g., to reduce probability of the payload being damaged. In some cases, the flight route may identify the positions of one or more charging stations that the UAV may utilize if needed.

At the points 145A and 150A, the UAV 105 may be within the line of sight of the terrestrial UE 115. Within the line of sight, the UAV 105 may receive control signals directly from the terrestrial UE 115. At the points 145B, 150B, and 150C, the UAV 105 may be beyond the line of sight of the terrestrial UE 115. Different base stations may provide better signal strength at the different points 145A-B and 150A-C. For example, among the base stations 120A-C, the base station 120A may be generally associated with the highest signal strength at the point 145A, whereas the base station 120B may be generally associated with highest signal strength at the point 150B.

As shown in FIG. 1, the coverage areas 125A-C of the base stations 120A-C may overlap. The coverage areas 125A-C may represent the coverage areas of the base stations 120A-C at ground level. The UAV 105 may be within range of two or more of the base stations 120A-C. For example, the UAV 105 may be within range of the base stations 120A and 120B in an overlap region 155. Based on a specific position of the UAV 105, signal strength between the UAV 105 and the base station 120A may be different from (e.g., stronger than, weaker than) signal strength between the UAV 105 and the base station 120B. In some cases, the overlap in the coverage regions may be more pronounced at flight altitudes than at ground level, such as due to fewer obstructions, and the overlap may be associated with regions of higher interference impact to the cellular network.

During flight on the flight route, the UAV 105 may select a serving base station based on relative signal strengths of different base stations and generate measurement reports containing power measurements associated with the serving base station and/or other surround base stations (e.g., neighbor base stations of the serving base station). The UAV 105 communicates with its serving base station via a communication channel assigned to the UAV 105 by the serving base station. For example, between the points 145A and 150B, the UAV 105 may select the base station 120A as its serving base station and perform measurements (e.g., power measurements) on signals transmitted to and received from the base station 120A and base stations 120B-C by the UAV 105. In this example, the measurements associated with the base stations 120B-C may be indicative of the interference impact of the UAV 105 on the base stations 120B-C when the UAV 105 is connected to the base station 120A. The base station 120A, as the serving base station of the UAV 105, decodes signals received from the UAV 105, whereas any signals received by the base stations 120B-C from the UAV 105 is considered noise (e.g., also referred to as uplink interference noise or simply interference noise) to the base stations 120B-C. The UAV 105 may select other base stations as its serving base station during the flight (e.g., based on relative signal strengths associated with different base stations). For example, between the points 150B and 150C, the UAV 105 may select the base station 120C as its serving base station. A handover of the UAV 105 from the base station 120A to the base station 120C may occur at or around the position 150B.

In an embodiment, during the flight over the flight route 140, the aerial traffic management system 130 may mitigate interference events associated with the RAN 120 (e.g., the base stations 120A-C). In this regard, in response to a detected interference event, the aerial traffic management system 130 may attribute the interference event to one or more UEs and select one or more of these UEs for mitigation. The aerial traffic management system 130 may send an instruction to the selected UE(s) to cause adjustment of an operation of the selected UE(s). For example, when the UAV 105 is streaming high definition video (e.g., for real-time virtual sightseeing applications), to reduce interference impact of the UAV 105, the aerial traffic management system 130 may send an instruction to cause the UAV 105 to lower its throughput in order to reduce the interference impact associated with the UAV 105.

The aerial traffic management system 130 may generate flight routes to be pre-programmed (e.g., preloaded) into UAVs (e.g., the UAV 105) and/or other aerial devices, such as the flight route 140 in FIG. 1, in response to requests for flight routes to be flown by the UAVs. The aerial traffic management system 130 may also generate channel allocation instructions associated with the flight routes. The aerial traffic management system 130 may generate a flight route and associated communication channel allocation instructions based on flight plan information provided by the operator(s) of the UAVs and geographic information associated with geographic regions encompassing the starting points and destination points.

In some cases, the aerial traffic management system 130 may provide a start time, end time, and/or time duration within which the UAV 105 flies on the flight route. In some cases, such as when the starting point 145A and destination point 145B are within a sparsely populated region, the aerial traffic management system 130 might not specify the start time and/or end time. For example, in a region with little to no air traffic, the aerial traffic management system 130 may indicate that the UAV 105 may be flown at any time (e.g., aside from any regulations associated with when UAVs may and may not be flown in a given geographic region).

The operator(s) may transmit the flight plan information to the aerial traffic management system 130 using the UAV 105 and/or the terrestrial UE 115. The flight plan information from the UAV 105 and/or the terrestrial UE 115 may include the starting point 145A and the destination point 145B that the UAV 105 needs to traverse. The UAV 105 and/or terrestrial UE 115 may provide other flight plan information to the aerial traffic management system 130 such as, by way of non-limiting example, a preferred departure time(s) (e.g., from the starting point 145A), a preferred arrival time(s) (e.g., at the destination point 145B), a preferred flight duration, characteristics/capabilities of the UAV 105 (e.g., size, shape, battery capacity, average flight speed, maximum flight speed, maximum flight altitude, wind resistance), and/or other characteristics associated with flight from the starting point 145A to the destination point 145B.

When generating and managing flight routes and/or channel allocation instructions for UAVs and/or other devices at flight altitude, the aerial traffic management system 130 complies with FAA requirements or recommendations, including temporary flight restrictions (e.g., temporary event such as wildfire or security-related event, stadiums/sporting events), restricted airspace, airport-related restrictions, local flight ordinances, and/or others. Other flight recommendations and/or requirements may be taken into consideration, such as any recommended or required minimum/maximum flight altitude and/or minimum/maximum flight speed. Similarly, the UAV 105 is operated to maintain a minimum distance separation between the UAV 105 and other UAVs, and/or between the UAV 105 and obstacles, e.g., such as minimum distance separation requirements or recommendations from the FAA.

In some embodiments, the airspace may be partitioned (e.g., divided, defined) into air corridors (e.g., also referred to as flight corridors, drone corridors, or drone air corridors), such as by authorities including the FAA, through which UAVs are allowed to fly. Definitions of the air corridors may be adjusted by the authorities. For example, air corridors may be defined and adjusted via a coordinated effort between various entities such as the FAA, agencies that analyze aerial traffic and effects of aerial traffic on ground-based activities and/or aerial-based activities, local municipalities, and/or others. In such embodiments, the aerial traffic management system 130 may retrieve definitions of the air corridors (e.g., from a database provided by the FAA) and generate flight routes by selecting and connecting one or more air corridors. Different air corridors may be associated with different geographic information (e.g., obstacle information, weather information, traffic management information including interference impact, etc.).

Figure 2:
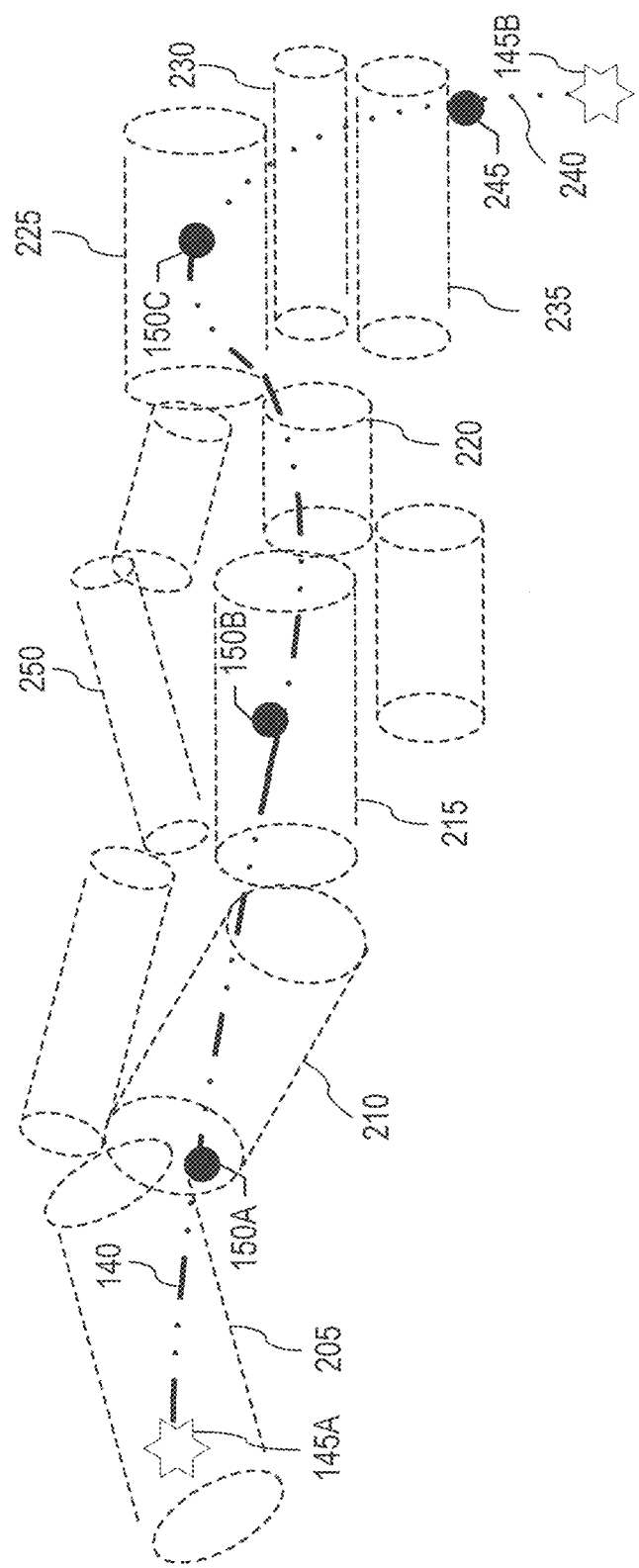
FIG. 2 illustrates an example of air corridors.

As an example, FIG. 2 illustrates an example of air corridors. The aerial traffic management system 130 may generate the flight route 140 by selecting from those air corridors shown in FIG. 2 and other air corridors not shown in FIG. 2. In FIG. 2, air corridors 205, 210, 215, 220, 225, 230, and 235 encompass the flight route 140. Examples of air corridors (e.g., 250) that are outside of the flight route 140 are also shown in FIG. 2. In some cases, the UAV 105 has autonomy on which positions within each air corridor 205, 210, 215, 220, 225, 230, and 235 to fly on the flight route 140, and may leverage its onboard sensors to navigate within each air corridor (e.g., to avoid collisions). In some cases, the aerial traffic management system 130 may specify a speed (e.g., average speed) at which the UAV 105 needs to traverse an air corridor and/or a time duration within which to completely traverse an air corridor (e.g., time from entering an air corridor to exiting the air corridor), e.g., for facilitating air traffic flow. Although the air corridors are depicted as cylindrically-shaped volumes of space, the air corridors may be other shapes.

As shown in FIG. 2, in an aspect, air corridors may be defined for portions of the flight route 140 above a certain altitude whereas a remaining portion 240 of the flight route 140 between a position 245 and the destination point 145B is below this altitude. The UAV 105 may leverage its onboard sensors to navigate the remaining portion 240. In this regard, in some embodiments, a flight route provided by the aerial traffic management system 130 may include only portions encompassed by air corridors. For example, the aerial traffic management system 130 may define a flight route from the starting point 145A to the position 245 and provide such a flight route to the UAV 105. The aerial traffic management system 130 may instruct (e.g., implicitly or explicitly) the UAV 105 to autonomously fly to the destination point 145B from the position 245. In this regard, flight from the position 245 to the destination point 145B may be referred to as a "last mile." Similarly, in some cases, such as when a starting point is below a certain altitude, the UAV 105 may leverage its onboard sensors to navigate a "first mile" or distance to reach a beginning of a flight route.

Figure 3:
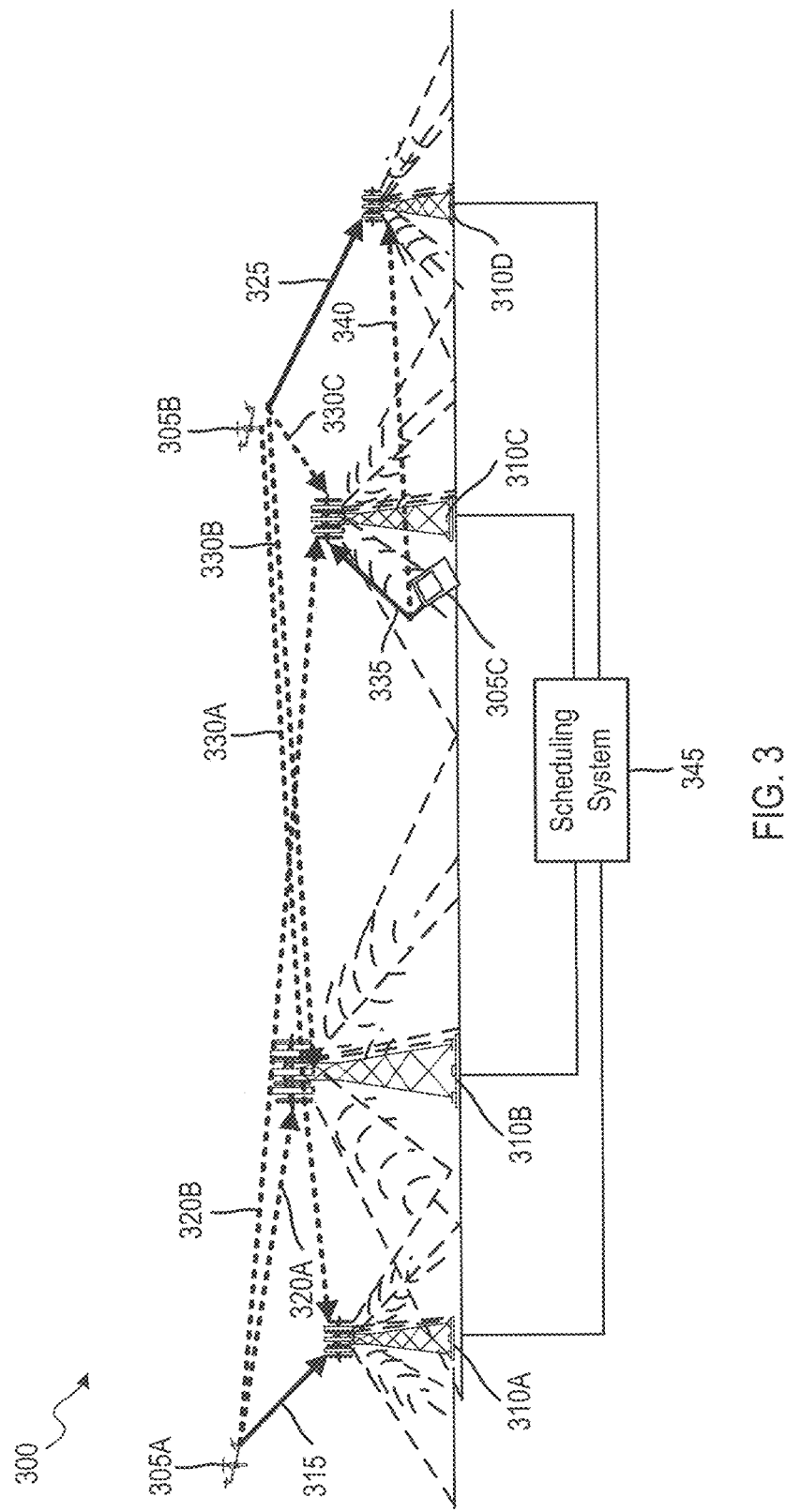
FIG. 3 illustrates an example of signal communication between base stations and UEs in an environment in accordance with one or more embodiments of the present disclosure.

FIG. 3 illustrates an example of signal communication between UEs 305A-C and one or more of base stations 310A-D of an environment 300 in accordance with one or more embodiments of the present disclosure. In FIG. 3, the UEs 305A and 305B are aerial UEs (e.g., UAVs) and the UE 305C is a terrestrial UE. In an embodiment, foregoing description of the UAV 105 of FIG. 1 applies to any one or more of the UEs 305A and 305B, the terrestrial UE 115 of FIG. 1 applies to the UE 305C, and/or any one of the base stations 120A-C of FIG. 1 applies to any one of the base stations 310A-D. It is noted that sizes of various components and distances between these components are not drawn to scale in FIG. 3.

At least a portion of the signal communication (e.g., a portion of signal power) associated with the UE 305A may be received by the base stations 310A, 310B, and 310C, as shown by arrows 315, 320A, and 320B, respectively. For example, the arrow 315 may represent a signal communicated between the UE 305A and the base station 310A. Similarly, at least a portion of the signal communication associated with the UE 305B may be received by the base stations 310A, 310B, 310C, and 310D as shown by arrows 330A, 330B, 330C, and 325, respectively. At least a portion of the signal communication associated with the UE 305C may be received by the base station 310C as shown by an arrow 335 and by the base station 310D as shown by an arrow 340. It is noted that signal communication is not limited to that represented by the arrows 315, 320A-B, 325, 330A-C, 335, and 340. In this regard, such signal communication not shown in FIG. 3 may be present but considered negligible (e.g., interference impact of the base station 310D attributed to the UE 305A is below a threshold level). For example, at least a portion of the signal communication associated with the UE 305A may be received by the base station 310D and/or other base stations. However, such portion of the signal communication received by the base station 310D and/or other base stations from the UE 305A may be considered negligible.

For explanatory purposes, the base station 310A is the serving base station of the UE 305A, the base station 310D is the serving base station of the UE 305B, and the base station 310C is the serving base station of the UE 305C. In this case, a connection/channel associated with the signal communication represented by the arrows 315, 325, and 335 may be considered an intended connection of the UE 305A, 305B, and 305C, respectively. The signal communication represented by the arrows 320A-B, 330A-C, and 340 may be considered interference received by non-serving cells. For example, the arrow 320A represents interference impact on the base station 310B attributable to the UE 305A.

A scheduling system 345 (e.g., a region-level or cell cluster-level scheduling system) may operate in tandem with instances of a scheduling system implemented locally at the base stations 310A-D. As such, the scheduling system 345 may be considered a hierarchically higher admission and congestion control layer (e.g., relative to the local instances of the scheduling system implemented at the base stations 310A-D) to control operation of UEs in a wider geographic location compared to a single site footprint. The base stations 310A-D may detect for interference events. As an example, the base station 310A may detect an interference event that it is experiencing and transmit an indication that the interference event has occurred or is occurring to the scheduling system 345. In response to the indication, the scheduling system 345 facilitates interference mitigation in response to any detected interference events. In some cases, when no interference events have been detected by the base stations 310A-D (e.g., none of the base stations 310A-D are experiencing interference above a threshold level), the scheduling system 345 may be in a low power mode. In an embodiment, the scheduling system 345 may be implemented as part of the aerial traffic management system 130 and/or the core network 135. In some cases, the scheduling system 345 may schedule coordinated utilization of resources in accordance with detected interference levels.

Figure 4:
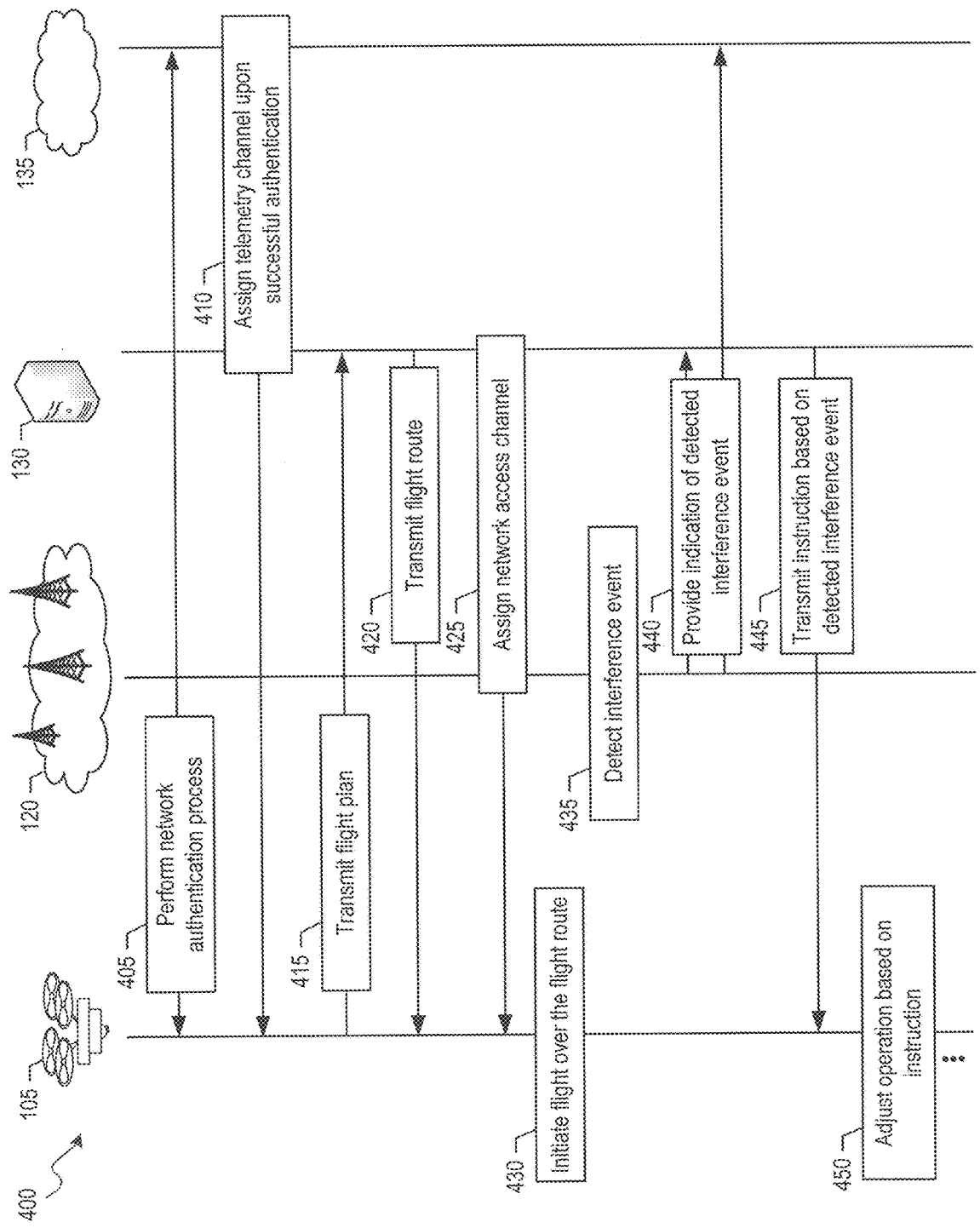
FIG. 4 illustrates a flow diagram of an example process for facilitating interference mitigation of aerial devices in accordance with one or more embodiments of the present disclosure.

FIG. 4 illustrates a flow diagram of an example process 400 for facilitating interference mitigation of aerial devices (e.g., during unmanned flight) in accordance with one or more embodiments of the present disclosure. For explanatory purposes, the example process 400 is described herein with reference to the example network environment 100 of FIG. 1; however, the example process 400 is not limited to the example network environment 100 of FIG. 1. For example, the example process 400 may be with reference to one or more UEs (e.g., UAVs) and/or one or more base stations not shown in FIG. 1. Note that one or more operations may be combined, omitted, and/or performed in a different order as desired. Although various operations are described as being performed by the aerial traffic management system 130, it is noted that in general some or all such operations may be performed alternatively and/or in addition by the core network 135.

At block 405, the UAV 105 performs an authentication procedure with the core network 135 by transmitting authentication data associated with the UAV 105 to the core network 135. The authentication procedure may be initiated by the UAV 105 or the core network 135. In some cases, the UAV 105 may initiate the authentication procedure (e.g., based on user settings). For example, the UAV 105 may initiate the authentication procedure as part of a stored information cell selection or an initial cell selection (e.g., upon switching on the UAV 105 or upon the UAV 105 finding no suitable cell using stored information cell selection). Alternatively or in addition, in some cases, the core network 135 may initiate the authentication procedure by sending an authentication request to the UAV 105, e.g., in response to the UAV 105 attempting to connect to one of the base stations (e.g., one of the base stations 120A-C or other base station) of the RAN 120.

The authentication procedure may be conducted via messages communicated between the UAV 105 and the core network 135. In an aspect, in cellular communication protocols such as UMTS and LTE, the messages may include non-access stratum (NAS) messages communicated between the UAV 105 and an MIME of the core network 135. In this aspect, the UAV 105 may include the authentication data in one or more NAS messages are transmitted to a base station (e.g., a base station selected or otherwise utilized by the UAV 105 as its serving base station) and forwarded by the base station to the MME.

In an embodiment, the core network 135 (e.g., the MIME of the core network 135) and/or the aerial traffic management system 130 facilitates authentication of the UAV 105 to the core network 135 based at least on the authentication data provided by the UAV 105. In this regard, the core network 135 may communicate (e.g., exchange messages) with the aerial traffic management system 130 to authenticate the UAV 105 to the core network 135. For example, the core network 135 may store, maintain, and/or otherwise have access to profiles of subscribed users and/or UEs and may provide information associated with such profiles to the aerial traffic management system 130, and the aerial traffic management system 130 may coordinate accessibility of UAVs to the RAN 120 based on the information from the core network 135.

In an aspect, the authentication data may include an indication that the UAV 105 is a device operated at or to be operated at flight altitude. In some cases, the indication may be a previous identifier (e.g., unique identifier) associated by the cellular network with the UAV 105 that ties the UAV 105 to a subscribed UE profile, and the profile may indicate that the UAV 105 is a UAV. Such association between the cellular network and the UAV 105 may be part of a provisioning of the UAV 105. In some cases, the UAV 105 may be associated with one or more traffic profiles during provisioning of the UAV 105. In an aspect, for any given UE, the aerial traffic management system 130 and/or the core network 135 may identify the UE as being an aerial device, a terrestrial device to be treated as an aerial device, or a terrestrial device.

Upon successful authentication of the UAV 105 to the core network 135, at block 410, the core network 135 and/or the aerial traffic management system 130 may assign a telemetry channel to the UAV 105. The telemetry channel may be a communication channel dedicated for use by the UAV 105 to transmit and receive (e.g., periodically and/or aperiodically) telemetry information associated with the UAV 105 and/or flight plan information. In some cases, the telemetry channel may be utilized for a command and control traffic profile associated with the UAV 105. The telemetry channel may be for communication between the UAV 105 and one or both of the aerial traffic management system 130 or the core network 135. By way of non-limiting example, the telemetry information may include a current location (e.g., latitude, longitude, altitude) of the UAV 105, current heading, current speed, current battery level, ambient weather (e.g., temperature, rain, hail, snow) at the current location, and/or other information. Such information may be transmitted by the UAV 105 to the core network 135 and/or aerial traffic management system 130 via the telemetry channel when at ground level and during flight of the UAV 105. Such information may be to monitor the UAV 105 to determine that the UAV 105 stays on the flight route, control the UAV 105 when needed, help locate the UAV 105 if connectivity to the UAV 105 is lost, among others.

It is noted that generally any transmitted messages (e.g., NAS messages) from the UAV 105 to the aerial traffic management system 130 and/or the core network 135 are forwarded by the RAN 120 (e.g., a serving base station of the UAV 105) to the aerial traffic management system 130 and/or the core network 135. Similarly, any messages received by the UAV 105 from the aerial traffic management system 130 and/or the core network 135 may be forwarded to the UAV 105 by the RAN 120.

At block 415, the UAV 105 transmits a flight plan to the aerial traffic management system 130. The UAV 105 may transmit the flight plan using the telemetry channel assigned to the UAV 105. The flight plan may include information associated with (e.g., indicative of) a starting point (e.g., 145A) and a destination point (e.g., 145B). In some cases, the flight plan may include information associated with an application (e.g., a mission). The application may include/identify one or more actions to be performed (e.g., successfully accomplished) by the UAV 105. For example, in a delivery application of the UAV 105, the application may involve delivering a package from the starting point 145A to the destination point 145B, with the application being completed when the package is delivered to the destination point 145B. In one case, one or more videos and/or pictures may be captured by the UAV 105 at or near the destination point 145B and transmitted to an operator of the UAV 105 (e.g., to facilitate landing and delivery of the payload) or to a customer of the payload (e.g., to indicate arrival of the payload or confirm delivery of the payload). In this case, with example reference to Table 1 above, the UAV 105 may be associated with the C&C traffic profile and/or one or more of the other five traffic profiles. In some cases, the UAV 105 may indicate frequency, bandwidth, bit rate, communication protocol, and/or other communication-related characteristics requested by the UAV 105 from the cellular network. In an aspect, in cases where one or more traffic profiles are previously associated with the UAV 105, such as during provisioning of the UAV 105, the application may be indicated by the traffic profile(s) and may, but need not, be provided as part of the flight plan.

At block 420, the aerial traffic management system 130 provides a flight route (e.g., 140) to the UAV 105. The flight route may be associated with a start time, an end time, and/or a time duration. The aerial traffic management system 130 may associate the flight route (e.g., the associated application) with an identifier that the UAV 105 uses to identify the flight route or related information (e.g., the associated application) to the cellular network. In this manner, actions (e.g., including flight) performed by the UAV 105 in relation to the flight route can be monitored.

The aerial traffic management system 130 may generate the flight route based on the flight plan from the UAV 105 and geographic information associated with a geographic region that encompasses the starting point (e.g., 145A) and the destination point (e.g., 145B). The geographic information may include interference information (e.g., interference patterns associated with the geographic region), weather information, obstacle information, and/or other information that may affect flight of the UAV 105. For the flight plan from the UAV 105, the aerial traffic management system 130 may identify a geographic region (e.g., define boundaries of a geographic region) that encompasses the starting point 145A and the destination point 145B provided in the flight plan. The aerial traffic management system 130 may define the geographic region to narrow the geographic scope the aerial traffic management system 130 needs to consider when determining the flight routes, e.g., to conserve on computation time and resources. In some embodiments, the flight route from the starting point to the destination point may be provided as a single airspace corridor or one or more connected airspace corridors. In some cases, the flight route may be provided finer granularity than the airspace corridors, such that the flight route defines positions/boundaries within each air corridor that the UAV 105 is to fly.

In some cases, the flight plan may be transmitted to the aerial traffic management system 130 by the terrestrial UE 115 alternatively and/or in addition to the UAV 105 transmitting the flight plan. Similarly, the aerial traffic management system 130 may transmit the flight route and associated information in one or more messages to the terrestrial UE 115 for the terrestrial UE 115 to relay to the UAV 105. As another example, the aerial traffic management system 130 may allow the UAV 105 and/or the terrestrial UE 115 to retrieve the generated flight route information, e.g., stored locally at the aerial traffic management system 130 and/or at a remote memory (e.g., memory of a remote server) associated with the aerial traffic management system 130.

In some embodiments, the operator of the UAV 105 and/or terrestrial UE 115 may generate a flight plan, via an interface, such as a user interface provided by a website and/or application program, and provide the generated the flight plan to the aerial traffic management system 130. The website and/or application program may be provided by one or more mobile network operators and/or another party to facilitate flight route generation and management. In response to receiving the operator's proposed flight plan, the aerial traffic management system 130 may generate a flight route and related information (e.g., start time, end time).

The interface may facilitate generation of the flight plan by the operator, and the operator may provide information on some or all fields (e.g., of a form) pertaining to the flight plan (e.g., starting point, destination point, departure and arrival time, actions to be performed on the flight). The aerial traffic management system 130 and/or the core network 135 may identify any fields not filled in by the operator as the operator having no preference or attributing a lowest importance/priority to the field, such as when the operator does not specify a departure time and an arrival time. In some cases, the aerial traffic management system 130 and/or the core network 135 may generate one or more potential flight routes based on information provided and information not provided by the operator and allow selection of a flight route by the operator.

At block 425, the RAN 120 and aerial traffic management system 130 assign a communication channel to the UAV 105. In an embodiment, the aerial traffic management system 130 may provide the channel allocation instructions to a serving base station of the UAV 105, and the serving base station assigns the communication channel (e.g., physical radio channel) for connecting the UAV 105 to the RAN 120 in accordance with the radio channel allocation instructions. The channel allocation instructions may be generated for connecting the UAV 105 to the RAN 120 and maintaining connectivity during flight of the UAV 105. In this regard, in some cases, the channel allocation instructions need not be applied prior to the UAV 105 initiating flight over the flight route. As the UAV 105 is handed over between base stations (e.g., during flight of the UAV 105), each base station that is selected as a serving base station of the UAV 105 assigns a communication channel to the UAV 105 based on the channel allocation instructions. In an aspect, the communication channel assigned at block 425 may be used to perform actions associated with one or more traffic profiles associated with the UAV 105 during operation of the UAV 105 (e.g., during flight on the flight route and/or when at or near ground level). The communication channel is separate from the telemetry channel, which is dedicated to be used by the UAV 105 to transmit telemetry information associated with the UAV 105 during flight on the flight route and receive adjustments to the flight route if adjustments are needed. In this regard, for example, to mitigate interference associated with the UAV 105, operation using the communication channel may be adjusted (e.g., to reduce throughput, reduce uplink power) whereas the telemetry channel is left alone such that navigation of the UAV 105 is unaffected. In some cases, blocks 420 and 425 may occur simultaneously or nearly simultaneously.

The channel allocation instructions are used by the base stations 120A-C and/or any base stations to establish a communication channel with the UAV 105 when the UAV 105 attempts to connect to these base stations on route to the destination point. The channel allocation instructions may indicate one or more frequency bands, a bit rate range (e.g., minimum and/or maximum allowed bit rate), an uplink power range, a communication protocol, and/or a type/category of LTE technology to be used by the radio access network to define a communication channel for the UAV 105. For example, when the UAV 105 selects the base station 120A as its serving base station, the base station 120A may assign a communication channel to the UAV 105 based on radio resource management of the base station 120A within bounds identified by the aerial traffic management system 130 in the channel allocation instructions. In some embodiments, different portions of the airspace may be associated with different channel allocation instructions, such as to account for differences in the distribution of available and/or utilized channel resources of the RAN 120 for connecting to UAVs flying in the different portions.

The UAV 105 receives and loads the flight route. In this regard, the flight route may be referred to as a pre-programmed flight route of the UAV 105. In some cases, the UAV 105 may transmit a message to acknowledge the flight route received from the aerial traffic management system 130. At block 430, the UAV 105 initiates flight from the starting point to the destination point in accordance with the flight route. The UAV 105 transmits measurement reports to a serving base station of the UAV 105 during flight over the flight route. Such measurement reports may be transmitted periodically or aperiodically. For example, with reference to FIG. 1, the UAV 105 may select a different base station as its serving base station for different portions of the flight route (e.g., based on respective signal strength of different base stations).

At block 435, the RAN 120 detects an interference event associated with the UAV 105. In this regard, a base station that is not a serving base station of the UAV 105 may determine an interference impact on the base station that is attributable to the UAV 105. The interference event (e.g., interference above a threshold level) may be detected based on power received by one or more antennas of this base station. As such, this base station may detect (e.g., in real-time) an interference impact associated with the UAV 105 (if any) on the base station.

At block 440, the RAN 120 provides an indication (e.g., a flag) to the aerial traffic management system 130 and/or the core network 135 to indicate that an interference event has been detected. In an aspect, the base station that detects the interference event associated with the UAV 105 generates a message that includes the indication and transmits the message to the to the aerial traffic management system 130 and/or the core network 135. In one case, a portion of the aerial traffic management system 130 and/or the core network 135 associated with facilitating interference mitigation may be in a low power mode (e.g., sleep mode, standby mode) when no interference events have been detected by the RAN 120 (e.g., none of the base stations of the RAN 120 are experiencing interference above a threshold level). The portion may exit out of the low power mode when an indication that an interference event has been detected is received from a base station of the RAN 120.

At block 445, the aerial traffic management system 130 transmits an instruction (e.g., a command) to the UAV 105 based on the detected interference event. The instruction may be generated and transmitted in response to the indication provided at block 440 and received by the aerial traffic management system 130. The instruction may be sent to the serving base station of the UAV 105 and relayed to the UAV 105 by the serving base station. In an aspect, the aerial traffic management system 130 may transmit the instruction using the telemetry channel. In an embodiment, as further described herein, the aerial traffic management system 130 may generate and transmit an instruction to the UAV 105 in response to: receiving an indication of an interference event from a base station of the RAN 120, determining that the UAV 105 and other UEs are associated with the interference event, and selecting the UAV 105 for mitigation. In some cases, selection of the UAV 105 may be based on a traffic profile of the UAV 105 relative to traffic profiles of other UEs. In some cases, the aerial traffic management system 130 may identify aerial devices and rogue drones as possible UEs to be selected for mitigation. In these cases, terrestrial devices at or near ground level or at high altitude in a structure (e.g., high-rise building) are not candidates for mitigation (e.g., unless there are no aerial devices and rogue drones).

At block 450, the UAV 105 receives the instruction and adjusts its operation based on the instruction. By way of non-limiting example, to mitigate interference associated with the UAV 105, the instruction may include an instruction to cause the UE to adjust one or more of a data compression associated with the UAV 105 (e.g., decrease size of data packets transmitted by the UE), a throughput associated with the UAV 105, an uplink power, a queueing scheme associated with the UAV 105, a different type/category associated with a communication technology, or a communication protocol/technology (e.g., UMTS) associated with the UAV 105. In this regard, prior to block 450, the UAV 105 may operate in accordance with a first operation of the UAV 105. At block 450, the UAV 105 may operate in accordance with a second operation of the UAV 105, where the first operation is adjusted to comply with the received instruction to implement the second operation. If the UAV 105 receives the instruction during a flight of the UAV 105, the UAV 105 continues the flight while operating according to the second operation of the UAV 105.

In some cases, to mitigate interference associated with the UAV 105, the aerial traffic management system 130 may migrate the UAV 105 or cause the UAV 105 to be migrated off of the cellular network and onto a different technology (e.g., other cellular technology or non-cellular technology). In such cases, the aerial traffic management system 130 determines that the cellular network (e.g., the RAN 120 and/or core network 135) is unable to accommodate the UAV 105.

The ellipses in FIG. 4 may represent additional communications between the RAN 120, aerial traffic management system 130, core network 135, and/or the UAV 105, which may include additional measurement report transmissions, data transmissions (e.g., according to a traffic profile(s) of the UAV 105), commands (e.g., for further adjusting operation of the UAV 105), and/or other transmissions. Although FIG. 4 is described with reference to the UAV 105, the example process 400 may be performed on any UEs (e.g., land-based vehicles, naval-based vehicles, and/or aerial vehicles) to facilitate interference mitigation associated with such UEs.

Figure 5:
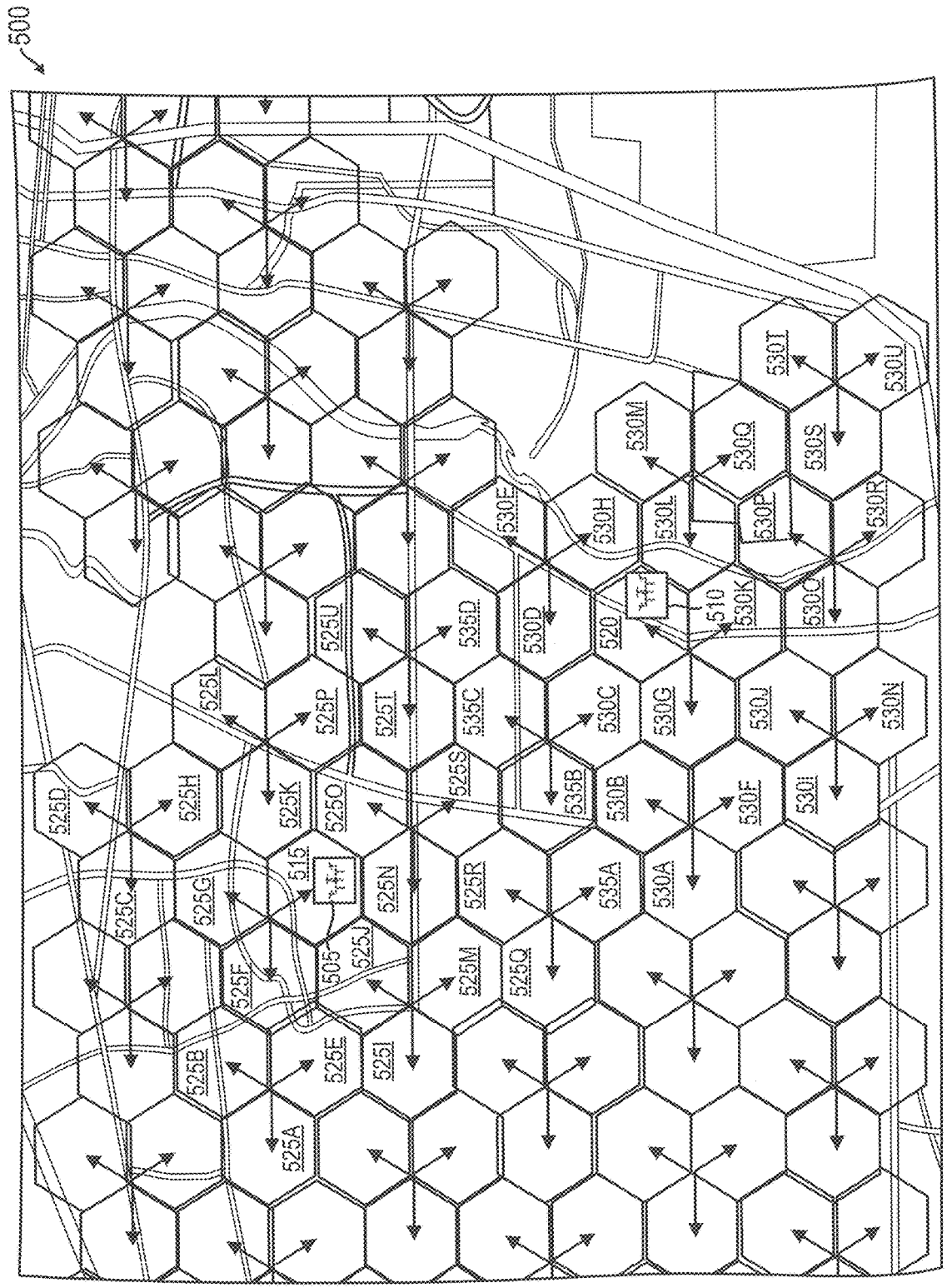
FIG. 5 illustrates an example of areas of pertinence associated with UEs in an environment in accordance with one or more embodiments of the present disclosure.

FIG. 5 illustrates an example of areas of pertinence associated with UAVs 505 and 510 in an environment 500 in accordance with one or more embodiments of the present disclosure. In this regard, FIG. 5 illustrates the UAVs 505 and 510 and their respective serving base stations, associated base stations, and non-associated base stations. In an embodiment, foregoing description of the UAV 105 of FIG. 1 applies to any one or more of the UAVs 505 and 510, and/or any one of the base stations 120A-C of FIG. 1 applies to any one of base stations 515, 520, 525A-U, 530A-U, and 535A-D. In FIG. 5, each hexagon may represent a coverage area (e.g., nominal coverage area) associated with a base station, of which certain ones of the base stations are identified by a reference numeral in a hexagon. The hexagons are overlaid over a map of a geographic location. The geographic location may include rivers, lakes, highways, surface streets, and so forth. It is noted that sizes of various components and distances between these components are not drawn to scale in FIG. 5.

In this regard, FIG. 5 provides positions of the UAVs 505 and 510 at a given moment in time (e.g., a snapshot in time). At this moment, the base station 515 is the serving base station of the UAV 505, and the base station 520 is the serving base station of the UAV 510. The base stations 525A-U and 535A-D are referenced as neighboring base stations of the base station 515. The base stations 530A-U and 535A-D are referenced as neighboring base stations of the base station 520. An area of pertinence associated with the UAV 505 may encompass a three-dimensional coverage provided by the base station 515 and the base stations 525A-U and 535A-D. An area of pertinence associated with the UAV 510 may encompass a three-dimensional coverage provided by the base station 520 and the base stations 530A-U and 535A-D. In FIG. 5, base stations that are not part of the areas of pertinence of the base stations 515 and 520 are not labeled with reference numerals.

Although in FIG. 5 the areas of pertinence associated with the UAVs 505 and 510 include the same number of base stations, in other embodiments the areas of pertinence associated with UAVs may be different from each other. Furthermore, while the foregoing description of FIG. 5 identifies an area of pertinence associated with a UAV as being defined as a coverage of the serving base station and base stations referenced as neighbors of the serving base station, other manners by which to define an area of pertinence may be utilized. In some cases, base stations within a certain distance of the serving base station may be included as part of the area of pertinence associated with this serving base station. In some aspects, a definition of an area of pertinence and/or a neighbor list(s) of a given base station may be based on automated measurement analytics using ML/AI methods.

Figure 6:
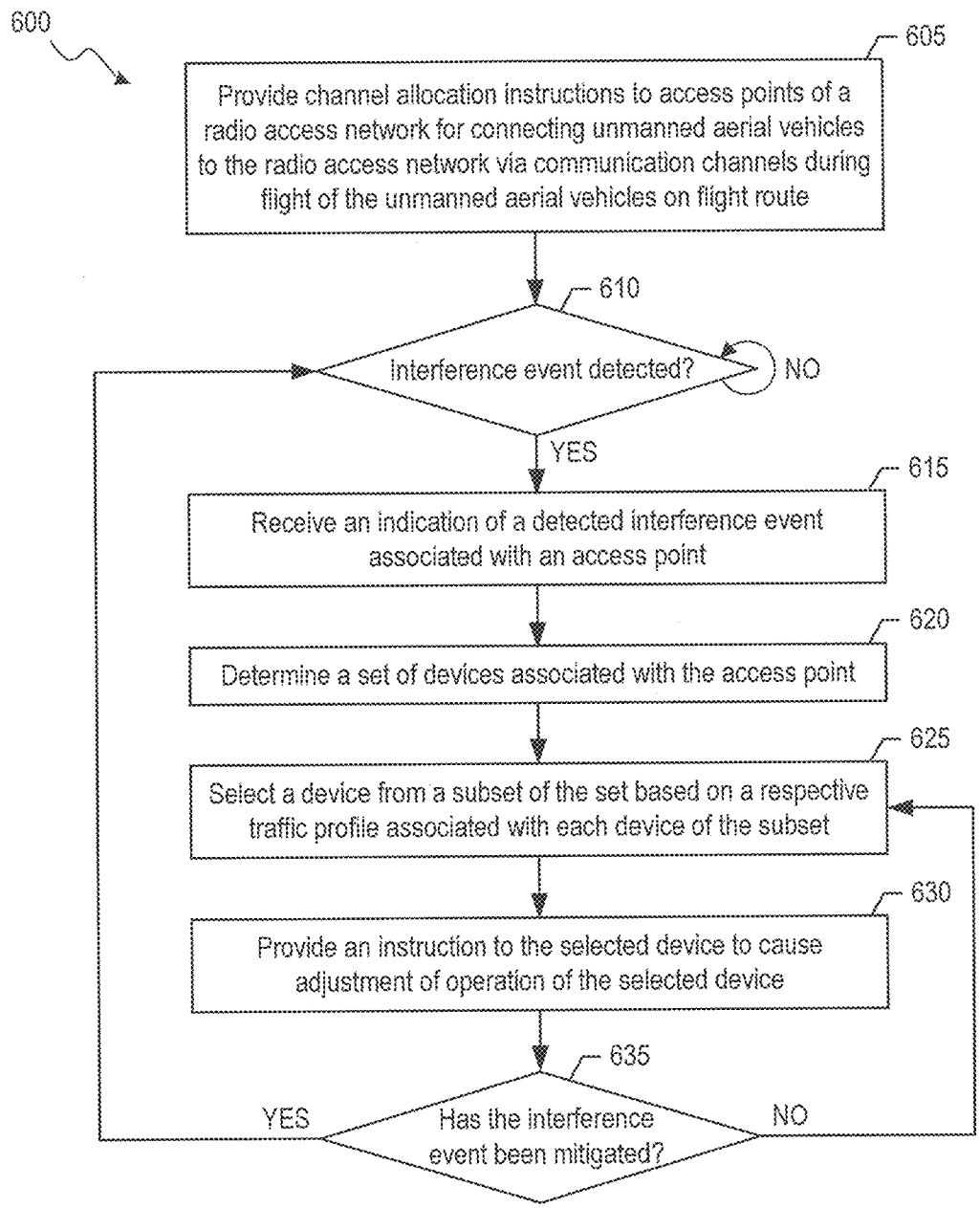
FIG. 6 illustrates a flow diagram of an example process for facilitating interference mitigation of aerial devices in accordance with one or more embodiments of the present disclosure.

FIG. 6 illustrates a flow diagram of an example process 600 for facilitating interference mitigation of aerial devices (e.g., during unmanned flight) in accordance with one or more embodiments of the present disclosure. For explanatory purposes, the example process 600 is described herein with reference to the example environment 500 of FIG. 5; however, the example process 600 is not limited to the example environment 500 of FIG. 5. Note that one or more operations may be combined, omitted, and/or performed in a different order as desired. For explanatory purposes, in an aspect, the example process 600 is performed by the aerial traffic management system 130. In general, some or all such operations may be performed alternatively or in addition by the core network 135. Although the process 600 is described with reference to the UAVs 505 and 510, the process 600 may be performed on any UEs (e.g., land-based vehicles, naval-based vehicles, and/or aerial vehicles) to facilitate interference mitigation associated with such UEs.

At block 605, an aerial traffic management system (e.g., 130 of FIG. 1) provides, to base stations of a RAN, channel allocation instructions for connecting the UAVs 505 and 510 during flight of the UAVs 505 and 510 on a flight route. With reference to FIG. 5, for a portion of the flight route, the base station 515 is the serving base station of the UAV 505, and the base station 520 is the serving base station of the UAV 510. For this portion of the flight route, the base station 515 and 520 connects to the UAV 505 and 510, respectively, via a physical communication channel defined by the base station 515 and 520, respectively, based on the channel allocation instructions. For example, when the base station 515 is the serving base station of the UAV 505, the base station 515 may assign a communication channel to the UAV 505 based on radio resource management of the base station 515 within bounds (e.g., frequency bands, bit rate range, communication protocol, etc.) specified by the aerial traffic management system in the channel allocation instructions. In some embodiments, different portions of the airspace may be associated with different channel allocation instructions, such as to account for differences in the distribution of available and/or utilized channel resources of the RAN for connecting to UAVs flying in the different portions.

At block 610, a determination is made as to whether an interference event has been detected. In this regard, each base station of the RAN detects for an interference event. The interference event may be detected during a flight of the UAVs 505 and 510 over a respective flight route. The interference event may be detected when an interference associated with the base station is above a threshold level. When a base station of the RAN detects an interference event associated with the base station, the base station may transmit, to the aerial traffic management system, an indication that the interference event has been detected by the base station (e.g., the base station is experiencing an interference above a threshold level). The interference may be based on power received by an antenna(s) of the base station. For explanatory purposes, as an example, the interference event is associated with the base station 535C. An example of a threshold level may be between 2 dB per PRB and 4 dB per PRB.

If no interference event has been detected by the base stations of the radio access network, the process 600 remains at block 610, in which the base stations of the radio access network detect for interference events (e.g., by monitoring power received by the base stations).

If an interference event has been detected by a base station, the process 600 proceeds to block 615. At block 615, the aerial traffic management system receives, from the base station, an indication of that an interference event associated with the base station has been detected. The indication may be contained in a message from the base station to the aerial traffic management system. In response to the detected interference event (e.g., in response to the indication of the interference event), at block 620, the aerial traffic management system determines a set of devices associated with the base station. In this regard, the set of devices include those one or more devices from which the base station receives power. For example, for a given device of the set of devices, signals transmitted by the device and received by the base station may include an indication (e.g., a signature) that identifies the device to the base station. In an embodiment, alternatively or in addition to utilizing each device's signature, the aerial traffic management system may determine the set of devices by identifying devices whose areas of pertinence encompass the base station. In this embodiment, the aerial traffic management system may identify devices in a geographic location around the base station, determine an area of pertinence associated with each device, determine which of the area(s) of pertinence encompass the base station, and determine the set of devices having one of the area(s) of pertinence. The geographic location around the base station may be defined as any location within a certain distance of the base station. In some cases, the area of pertinence associated with a device may include base stations referenced as neighboring base stations of the device's serving base station and/or base stations within a certain distance of the device's serving base station. With continued reference to the above example, when the detected interference event is associated with the base station 535C, the aerial traffic management system determines that the UAVs 505 and 510 are associated with the base station 535C (e.g., since the base station 535C is encompassed by the areas of pertinence of both the UAV 505 and 510).

At block 625, the aerial traffic management system selects a device from a subset of the set of devices determined at block 620 based on a respective traffic profile associated with each device of the set. In some aspects, the set of devices may include aerial devices, rogue drones, and terrestrial devices. The subset of the set may include aerial devices and rogue drones. In these aspects, terrestrial devices that are not rogue drones are not candidates for interference mitigation at least until appropriate aerial drones and rogue drones have been accounted for. In some aspects, certain aerial devices and/or rogue drones are not candidates for interference mitigation. For example, aerial devices and/or rogue drones utilized as part of first responder missions may be exempt from interference mitigation.

The selected device is selected for interference mitigation, such that subsequent to the interference mitigation the interference impact of the selected device on the base station (e.g., the base station 535C in the above example) is reduced. In an aspect, the device associated with a lowest priority (e.g., traffic profile associated with a lowest priority) is selected by the aerial traffic management system. With continued reference to the above example, the aerial traffic management system selects either the UAV 505 or the UAV 510. As an example, the UAV 505 may be associated with a lower priority than the UAV 510 and thus the UAV 505 is selected by the aerial traffic management system.

At block 630, the aerial traffic management system provides an instruction to the selected device to cause adjustment of an operation of the selected device. The instruction, when implemented by the selected device, is intended to reduce an interference impact on the base station (e.g., the base station 535C in the above example) associated with the selected device. In an aspect, operation of the selected device in response to the instruction may be referred to as interference-mitigated operation of the selected device. As an example, if the UAV 505 is selected at block 625, the aerial traffic management system provides an instruction to the UAV 505 to cause adjustment of an operation of the UAV 505. In one case, the instruction may include an instruction to adjust at least one of data compression associated with the UAV 505, a throughput associated with the UAV 505, an uplink power associated with the UAV 505, a queueing scheme associated with the UAV 505, and/or a communication protocol associated with the UAV 505. In another case, the instruction may include an instruction to migrate the UAV 505 from the RAN to a different network (e.g., a network of a different communication technology than the RAN). In some cases, the UAV 505 continues the flight over the flight route and operates according to the interference-mitigated operation at least until handover of the UAV 505 to a different serving base station, at which point interference impact of the UAV 505 on the RAN may be evaluated (e.g., by the RAN and/or the aerial traffic management system).

By way of non-limiting example, the aerial traffic management system 130 may determine whether the UAV 105 may be migrated to a radio channel of a different frequency band, lower bit rate (e.g., lower video bit rate), different type/category (e.g., migrate to 4G LTE-M from 4G LTE) associated with a communication technology (e.g., 4G), and/or different communication technology (e.g., UMTS). As an example, the aerial traffic management system 130 may migrate the UAV 105 from a 4G LTE-based communication channel to a 4G LTE-M-based communication channel.

At block 635, the RAN and/or the aerial traffic management system determines whether the interference event has been mitigated. The interference event may be mitigated when the interference associated with the base station (e.g., the base station 535C in the above example) is below the threshold level. If the determination is that the interference event has been mitigated, the process 600 proceeds to block 610, in which the radio access network monitors for another interference event to be mitigated.

Figure 7:
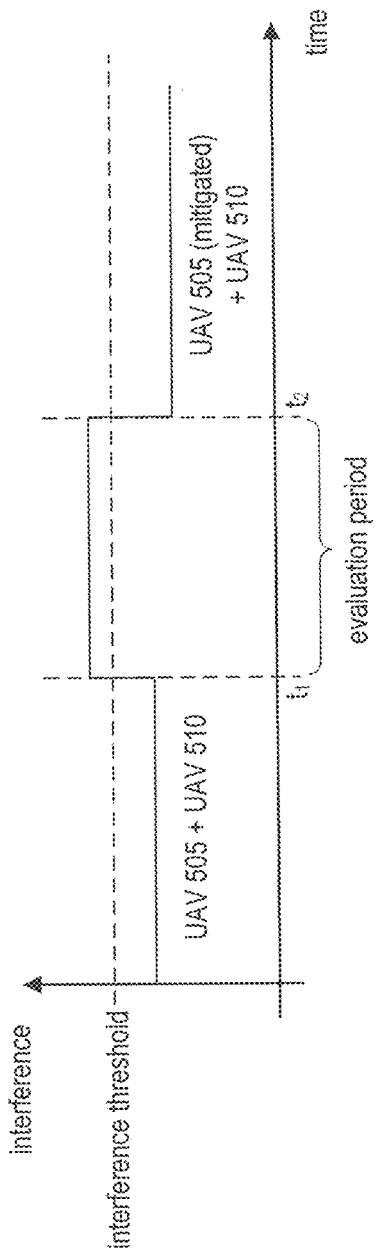
FIG. 7 illustrates a graph of interference level over time relative to an interference threshold in accordance with one or more embodiments of the present disclosure.

As an example, FIG. 7 illustrates a graph of interference level over time relative to an interference threshold for the base station 535C in accordance with one or more embodiments of the present disclosure. As shown in FIG. 7, an interference level associated with the base station 535C is attributed to the UAV 505 and the UAV 510. An uplink interference condition is triggered when the interference level rises above the interference threshold (e.g., a base station is experiencing an interference event). The interference level may be evaluated for an amount of time (e.g., a predetermined amount of time) referred to as an evaluation period. In FIG. 7, the evaluation period begins at a time $t_1$ and ends at a time $t_2$. The evaluation period may be initiated at the time $t_1$ in response to the aerial traffic management system receiving an indication from a base station that the base station is experiencing an interference event. If the interference level decreases and remains at a level below the threshold level during the evaluation period (not shown in FIG. 7), an interference event may be determined to have not occurred and no mitigation of the UAVs 505 and the UAV 510 needs to be performed. In an aspect, the evaluation period may be determined and adjusted based on automated measurement analytics using MIL/AI methods to facilitate interference mitigation of the UAVs 505 and 510 and/or other UEs as appropriate to maintain network connectivity at a certain quality of service to the RAN via the base station 535C.

If the interference level remains above the threshold level for at least the evaluation period, an interference event is determined to have occurred. In FIG. 7, the interference level of a base station within an area of pertinence of the UAVs 505 and 510 rises above the interference threshold and remains above the interference threshold for at least the evaluation period. The aerial traffic management system selects the UAV 505 for mitigation (e.g., based on the UAV 505 being associated with a lower priority level than the UAV 510) and causes the UAV 505 to adjust its operation. Upon the UAV 505 adjusting its operation (e.g., the UAV 505 is mitigated), the interference level associated with the base station 535C is below the interference threshold. In an aspect, while the graph of FIG. 7 is described with reference to the base station 535C, the graph of FIG. 7 may be associated with any base station encompassed by areas of pertinence of two or more UEs.

In some cases, a portion of the aerial traffic management system associated with interference mitigation of aerial devices may transition out of a low power mode in response to receiving the indication from the base station in order to perform blocks 620, 625, 630, and 635. In this regard, in the low power mode, the portion may be standing by for an indication of an interference event from one or more of the base stations of the radio access network. The portion may transition to the low power mode when existing interference events have been mitigated and transition out of the low power mode upon receiving an indication of an interference event from a base station. In this regard, in FIG. 7, the portion may be transitioned out of the low power mode in response to a trigger event (e.g., triggering of an uplink interference condition) at $t_1$. The trigger event may be the portion receiving an indication of an interference event from a base station of the RAN.

With reference back to FIG. 6, if the determination is that the interference event has not been mitigated, the process 600 proceeds to block 625. At block 625, the aerial traffic management system may select a device previously selected for mitigation or select another device (e.g., a device that has not been previously selected for mitigation). With continued reference to the above example, the aerial traffic management system may select the UAV 505 again for further mitigation (e.g., further reduced throughput) or select the UAV 510 for mitigation. In an example with more than two UAVs, during a first iteration, the aerial traffic management system may select a UAV associated with the lowest priority level, and during a second iteration, the aerial traffic management system may select a UAV associated with the second lowest priority level.

In an aspect, the aerial traffic management system may determine which UAV to select (e.g., whether to select the UAV 505 again or select the UAV 510) based on estimates of potential reduction of interference impact of the UAV 505 or the UAV 510 in response to various potential instructions for adjusting operation of the UAV 505 or the UAV 510. As one example, to select a UE from among UEs associated with the same traffic profile, the UE associated with a higher potential reduction of interference impact may be selected. In some cases, when priority levels are different, a difference between a priority level associated with the UAV 505 and a priority level associated with the UAV 510 may be taken into consideration. As one example, with reference to Table 1 above, if the UAV 510 is associated with the C&C traffic profile and the video surveillance traffic profile (e.g., priority level 2) whereas the UAV 505 is associated with the C&C traffic profile and the high definition picture traffic profile (e.g., priority level 6), the aerial traffic management system may again select the UAV 505 for mitigation rather than select the UAV 510. As another example, with reference to Table 1 above, if the UAV 510 is associated with the C&C profile and the video surveillance profile (e.g., priority level 2) whereas the UAV 505 is associated with the C&C profile and the low definition streaming profile (e.g., priority level 3), the aerial traffic management system may select the UAV 510 for mitigation rather than select the UAV 505 again for mitigation due to the proximity in priority level associated with the UAV 505 and the UAV 510. In some cases, the aerial traffic management system may perform the selection based on whether the UAV 505 or the UAV 510 is associated with one or more other interference events (e.g., an interference event other than the interference event detected at block 610). For example, the UAV associated with higher overall interference impact on the RAN (e.g., rather than just its interference impact on the base station 535C in the above example) may be selected for mitigation. Other manners by which to select a UAV for mitigation may be performed.

It is noted that, while the process 600 illustrates mitigation of a single interference event by an aerial traffic management system, an aerial traffic management may detect multiple interference events and facilitate mitigation of multiple interference events simultaneously or substantially simultaneously. In some cases, mitigation of one interference event may summarily cause another interference event to be mitigated, such as when a UAV associated with multiple simultaneous or substantially simultaneous interference events is mitigate (e.g., by causing adjustment of operation of this UAV). In this regard, in an aspect, the aerial traffic management system may select a UAV (e.g., at block 625) for mitigation based on a number of simultaneous or substantially simultaneous interference events associated with the UAV. For example, alternatively or in addition to relative traffic profiles associated with UAVs, the UAV associated with higher overall interference impact on the RAN (e.g., rather than just its interference impact on the base station 535C in the above example) may be selected for mitigation.

Figure 8:
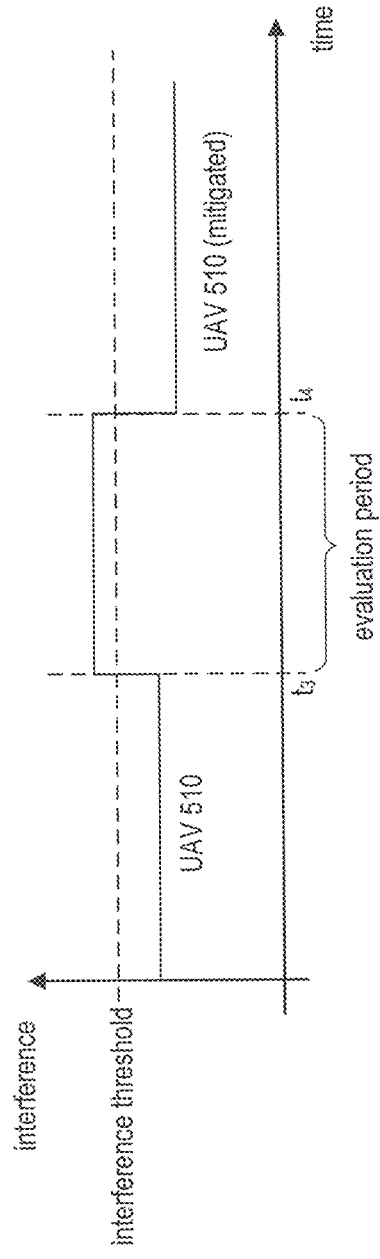
FIG. 8 illustrates a graph of interference level over time relative to an interference threshold for a base station in accordance with one or more embodiments of the present disclosure.

Although the foregoing description provides an example in which a set of devices includes more than one device, in some cases, the set of devices includes a single device. In this case, the single device is selected for mitigation. As an example, FIG. 8 illustrates a graph of interference level over time relative to an interference threshold for a base station in accordance with one or more embodiments of the present disclosure. As shown in FIG. 8, an interference level associated with the base station is attributed to the UAV 510. For example, with reference to the environment 500 of FIG. 5, the base station may be any one of the base stations 530A-U when the base station 520 is the serving base station of the UAV 510. The uplink interference condition is triggered when the interference level is above the interference threshold. An evaluation period starts at $t_3$ and ends at $t_4$. If the interference level decreases and remains at a level below the threshold level during the evaluation period (not shown in FIG. 8), an interference event may be determined to have not occurred and no mitigation of the UAV 510 needs to be performed. If the interference level remains above the threshold level for at least the evaluation period, an interference event is determined to have occurred. The aerial traffic management system identifies the UAV 510 as being associated with the interference level and causes the UAV 510 to adjust its operation. Upon the UAV 510 adjusting its operation (e.g., the UAV 510 is mitigated), the interference level associated with the base station is below the interference threshold.

Figure 9:
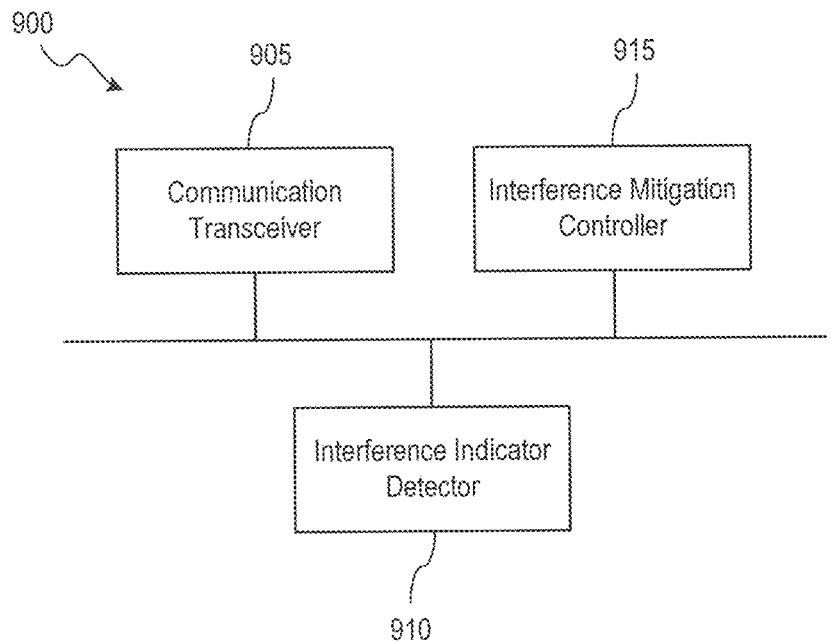
FIG. 9 illustrates a block diagram of an example of an interference mitigation unit in accordance with one or more embodiments of the present disclosure.

FIG. 9 illustrates a block diagram of an example of an interference mitigation unit 900 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the interference mitigation unit 900 is described herein with reference to the example network environment 100 of FIG. 1; however, the interference mitigation unit 900 is not limited to the example network environment 100 of FIG. 1. In an aspect, the aerial traffic management system 130 and/or the core network 135 may include the interference mitigation unit 900, or components thereof.

The interference mitigation unit 900 may include a communication transceiver 905, an interference indicator detector 910, and an interference mitigation controller 915. The communication transceiver 905 may implement appropriate physical layer(s) and protocol stack(s) to enable communication between the aerial traffic management system 130 and/or core network 135 with each other and/or the RAN 120 and/or UEs (e.g., the UAV 105, the terrestrial UE 115). The communication transceiver 905 may transmit messages to the RAN 120 to relay to the UEs. In an embodiment, the communication transceiver 905 may be utilized to obtain measurement reports (e.g., from the RAN 120) and transmit interference mitigation instructions to UEs (e.g., using the RAN 120 as relay) to cause adjustment of operation of UEs.

The interference indicator detector 910 may receive indications of interference events associated with the RAN 120 (e.g., the base stations 120A-C and/or other base stations). In some cases, an interference event may be detected by a base station of the RAN 120 when an interference level experienced by the base station is above a threshold level. In some cases, alternatively or in addition, an interference event may be detected based on performance characteristics such as call drop rate, handover success rate, SNR, SINR, and/or throughput of the base station of the RAN 120. The interference mitigation controller 915 may, in response to an indication of an interference event from a base station, identify UEs associated with the interference event, select a UE from among these identified UEs for mitigation, and generate an instruction to cause the selected UE to adjust its operation to reduce the selected UE's interference impact on the RAN 120. The instruction may include an instruction to adjust one or more of a data compression associated with the UE (e.g., data size transmitted by the UE), a throughput associated with the UE, an uplink power associated with the UE, a queueing scheme associated with the UE, a different type/category associated with a communication technology, or a communication protocol/technology associated with the UE.

Figure 10:
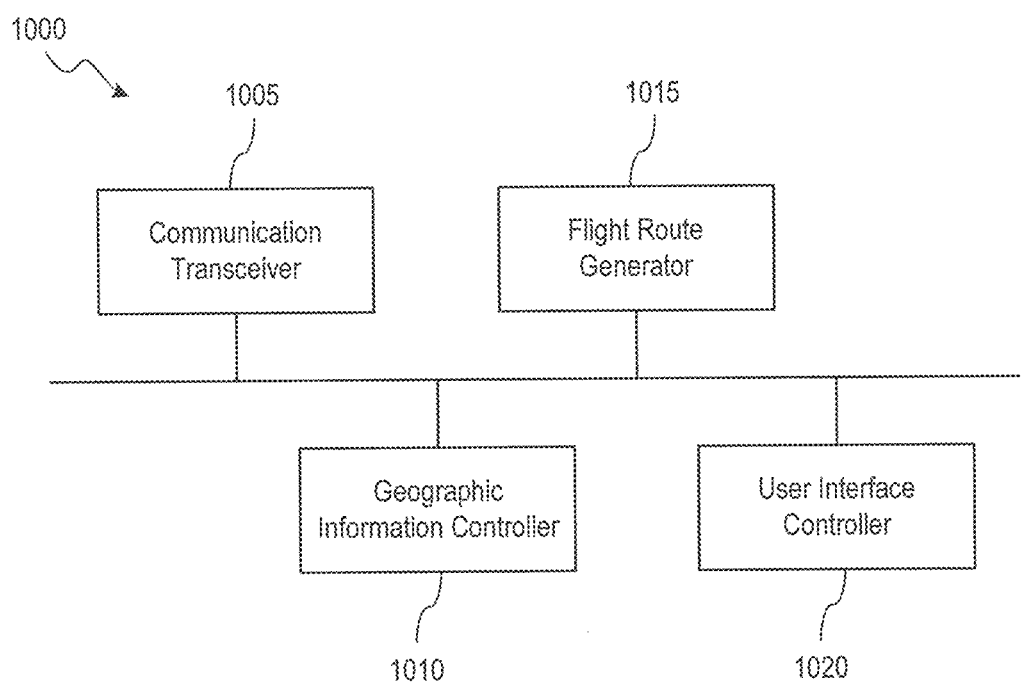
FIG. 10 illustrates a block diagram of an example of a flight management unit in accordance with one or more embodiments of the present disclosure.

FIG. 10 illustrates a block diagram of an example of a flight management unit 1000 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the flight management unit 1000 is described herein with reference to the example network environment 100 of FIG. 1; however, the flight plan processing unit 1000 is not limited to the example network environment 100 of FIG. 1. In an aspect, the aerial traffic management system 130 and/or the core network 135 may include the flight management unit 1000, or components thereof.

The flight management unit 1000 may include a communication transceiver 1005, a geographic information controller 1010, a flight route generator 1015, and a user interface (UI) controller 1020. The communication transceiver 1005 may implement appropriate physical layer(s) and protocol stack(s) to enable communication between the aerial traffic management system 130 and/or core network 135 with each other and/or the RAN 120 and/or UEs (e.g., the UAV 105, the terrestrial UE 115). The communication transceiver 1005 may allow the aerial traffic management system 130 and/or core network 135 to transmit messages (e.g., NAS messages) to and/or receive messages from the UAV 105 (e.g., directly or indirectly).

The geographic information controller 1010 may be utilized to retrieve and process geographic information associated with a geographic region encompassing a starting point and a destination point provided by an operator. The geographic information may include obstacle information, weather information, emergency broadcast information, and/or other information, which may be retrieved from various sources.

The geographic information may also include traffic information, including air traffic information, from the base stations 120A-C and/or other base stations associated with the same mobile network operator, base stations of one or more other mobile network operator, and/or another party. For example, the traffic information may indicate utilization/occupancy associated with different base stations, interference impact associated with different portions of the airspace, and/or traffic profiles associated with UEs in different portions of the airspace. In this regard, the geographic information controller 1010 may generate control signals to be transmitted via the communication transceiver 1005, and cause traffic information to be received via the communication transceiver 1005. The geographic information may be utilized as is or may be processed into a form more readily usable for facilitating flight route generation. For example, the traffic information may be, or may be processed to obtain, traffic statistics.

The flight route generator 1015 may be utilized to generate flight routes and channel allocation instructions for connecting to the cellular network during flight of UAVs on associated flight routes. The flight routes and channel allocation instructions may be generated based on geographic information of the geographic region encompassing the starting point and the destination point and/or information from an operator. The flight route generator 1015 may receive signals from the geographic information controller 1010. The flight route generator 1015 may also adjust previously generated flight routes and/or channel allocation instructions based on detected events (e.g., changes to the geographic information) or the operator's flight plan. In an embodiment, the flight route generator 1015 may generate flight routes by connecting one or more predefined air corridors. The flight route generator 1015 may store, or may have access to, information pertaining to flight routes currently being effectuated by various UAVs, flight routes that have been completed in the past, and flight routes to be initiated in the future.

The UI controller 1020 may be utilized to provide an interface for facilitating providing of user input to generate and manage flight plans. For example, the UI controller 1020 may provide a user interface on a website and/or an application program that accepts user input from an operator. By way of non-limiting example, the user interface may allow the operator to provide information that may be utilized by the flight route generator 1015 to generate flight plans and/or adjust existing flight plans.

Figure 11:
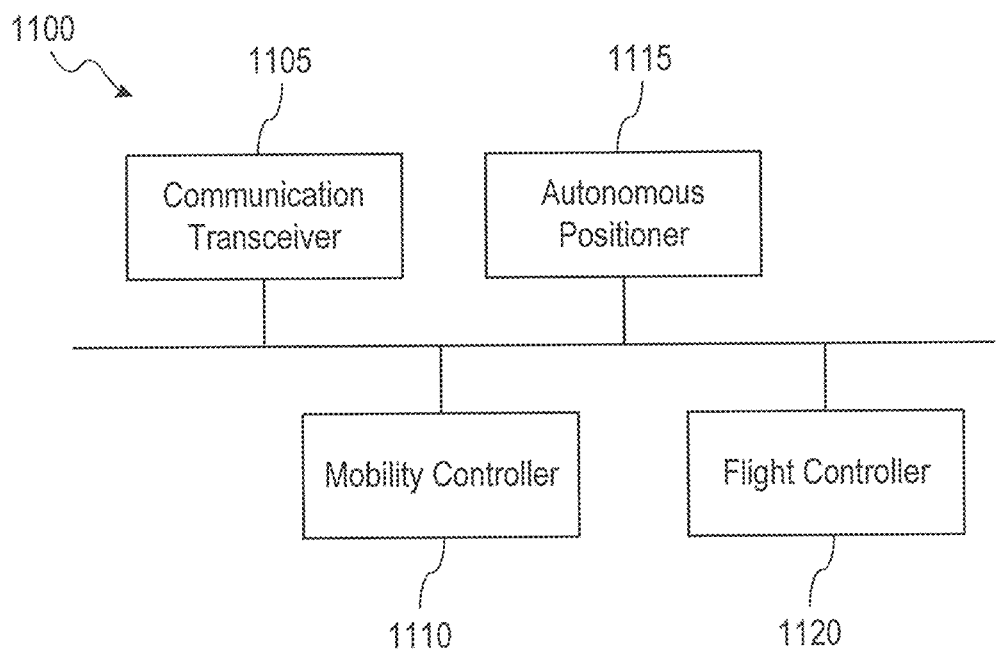
FIG. 11 illustrates a block diagram of an example of a UAV processing unit in accordance with one or more embodiments of the present disclosure.

FIG. 11 illustrates a block diagram of an example of a UAV processing unit 1100 in accordance with one or more embodiments of the present disclosure. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. For explanatory purposes, the UAV processing unit 1100 is described herein with reference to the example network environment 100 of FIG. 1; however, the UAV processing unit 1100 is not limited to the example network environment 100 of FIG. 1. In an aspect, the UAV 105 includes the UAV processing unit 1100.

The UAV processing unit 1100 may include a communication transceiver 1105, a mobility controller 1110, an autonomous positioner 1115, and a flight controller 1120. The communication transceiver 1105 may implement appropriate physical layer(s) and protocol stack(s) to enable communication between the UAV 105 and the terrestrial UE 115, base stations 120A-C, aerial traffic management system 130, and/or core network 135. For example, the communication transceiver 1105 may include an LTE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications. The communication transceiver 1105 may allow the UAV 105 to transmit messages to and/or receive messages from the terrestrial UE 115, base stations 120A-C, aerial traffic management system 130, and/or core network 135 using the antenna 110 and/or other antenna. In some cases, data transmissions to and from the UAV 105 may occur over communication channels (e.g., physical communication channels) defined by a serving base station based on channel allocation instructions from the aerial traffic management system 130.

The mobility controller 1110 may implement any control and feedback operations appropriate for interacting with the avionics, control actuators, and/or other equipment included in the flight control unit to fly the UAV 105, including, but not limited to, taking off, landing, and/or setting/adjusting direction, velocity, and/or acceleration of the UAV 105. In some cases, the mobility controller 1110 may receive commands from the terrestrial UE 115, base stations 120A-C, aerial traffic management system 130, and/or core network 135, to, for example, configure a flight route (e.g., program a flight route), adjust a programmed flight route, deploy the UAV 105, land the UAV 105, navigate the UAV 105, and/or other commands that facilitate navigating the UAV 105 and utilizing the UAV 105 to perform an action. In some cases, the mobility controller 1110 may receive commands to move and/or rotate the UAV 105 and/or component thereof (e.g., the antenna 110).

The autonomous positioner 1115 may be utilized to monitor (e.g., autonomously monitor) a current position of the UAV 105. The autonomous positioner 1115 may include, or may be in communication with (e.g., via the communication transceiver 1105), a GPS that provides the position of the UAV 105. In some cases, the autonomous positioner 1115 may implement location determination techniques. In an aspect, the autonomous positioner 1115 may determine a positional difference between the UAV 105 and a base station (e.g., the base station 120A) based on the position information of the UAV 105 and the base station. For example, the autonomous positioner 1115 may generate signals (e.g., for the mobility controller 1110) that cause rotation and/or movement of the antenna 110 (e.g., a directional antenna).

The flight controller 1120 may be utilized to identify the current position of the UAV 105 (e.g., provided by the autonomous positioner 1115) relative to positions in a pre-programmed flight route. The flight controller 1120 may receive and process information from onboard sensors, base stations 120A-C, aerial traffic management system 130, core network 135, and/or other devices to determine whether to maintain the UAV 105 on the pre-programmed flight route or to deviate from the pre-programmed flight route (e.g., to avoid a collision). The flight controller 1120 may generate control signals that cause the mobility controller 1110 to fly the UAV 105 along a route specified by the control signals, which may or may not differ from the pre-programmed flight route, and/or control signals that cause movement and/or rotation of the UAV 105 and/or component thereof.

While an example manner of implementing the interference mitigation unit 900, flight management unit 1000, and UAV processing unit 1100, are illustrated in FIGS. 9, 10, and 11, respectively, one or more of the components (e.g., elements, processes, and/or devices) illustrated in FIGS. 9, 10, and 11 may be combined, divided, re-arranged, omitted, eliminated, and/or implemented in any other way. Further, the various components (e.g., 905, 910, 915, 1005, 1010, 1015, 1020, 1105, 1110, 1115, 1120) may be implemented by hardware, software, firmware, and/or any combination of hardware, software, and/or firmware. Thus, for example, any of these components, and/or, more generally, the interference mitigation unit 900, flight management unit 1000, and UAV processing unit 1100 may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the interference mitigation unit 900, flight management unit 1000, and UAV processing unit 1100 may be referred to as an interference mitigation circuit, a flight management circuit, and a UAV processing circuit, respectively.

When reading any claims as set forth herein to cover purely software and/or firmware implementations, at least one of the units or components in FIGS. 9, 10, and 11 is hereby expressly defined to include a tangible computer readable storage device or storage disk such as a memory, digital versatile disk (DVD), compact disk (CD), a Blu-ray Disc™, and/or other storage device/disk storing the software and/or firmware.

Figure 12:
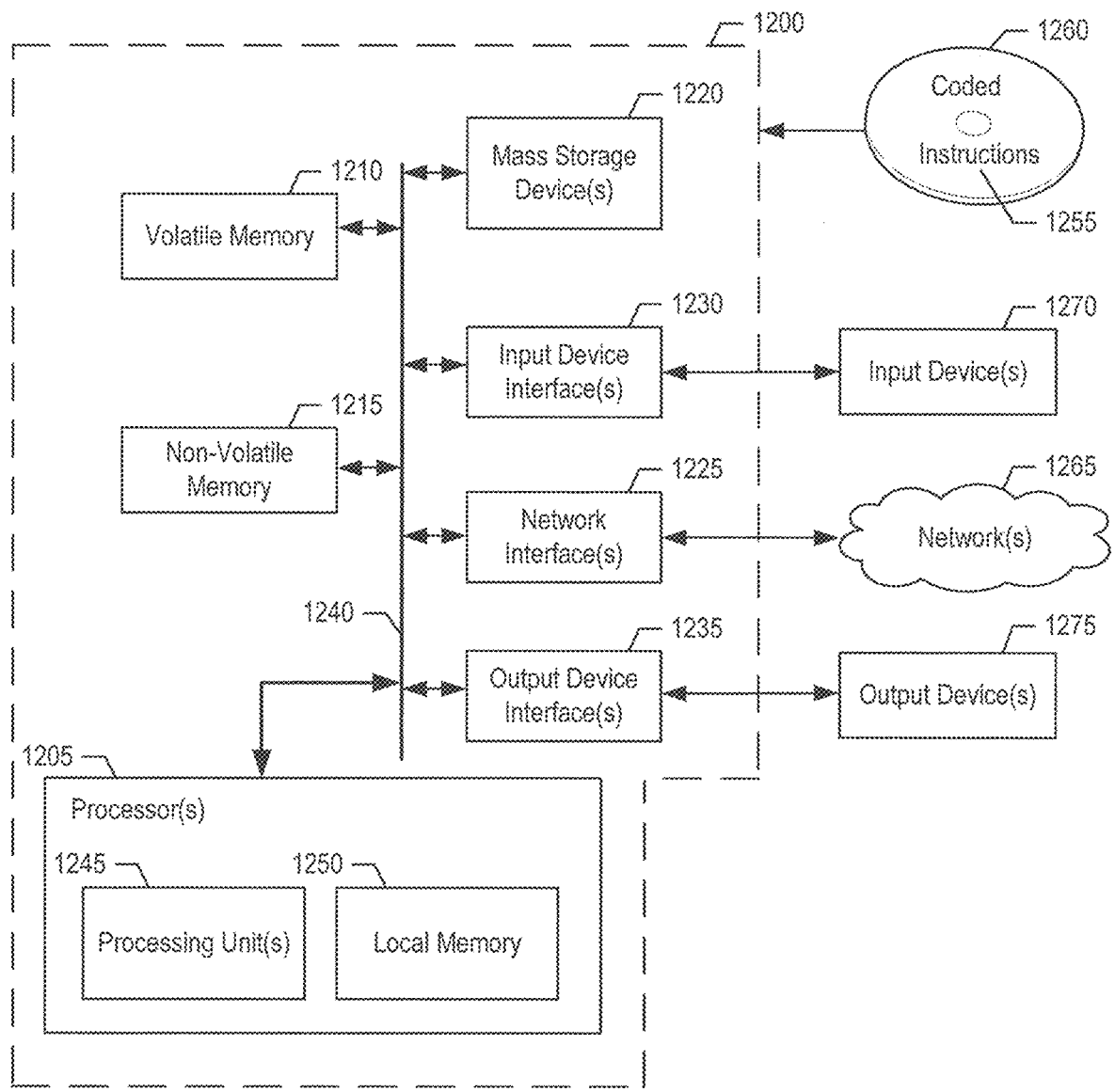
FIG. 12 illustrates a block diagram of an example of an electronic system with which one or more embodiments of the present disclosure may be implemented.

FIG. 12 illustrates a block diagram of an example of an electronic system 1200 with which one or more embodiments of the present disclosure may be implemented. In an embodiment, the electronic system 1200 may be, may include, or may be referred to as, processor platform. The electronic system 1200 can generally be any type of computing device. In an embodiment, the electronic system 1200 can be, can include, and/or can be a part of, one or more of the UAV 105, terrestrial UE 115, base stations 120A-C, aerial traffic management system 130, core network 135 (e.g., MME of the core network 135) shown in FIG. 1. For example, the electronic system 1200 may be, may include, or may be a part of, the UAV 105.

The electronic system 1200 includes one or more processors 1205, volatile memory 1210, non-volatile memory 1215, one or more mass storage devices 1220, one or more network interfaces 1225, one or more input device interfaces 1230, one or more output device interfaces 1235, and a link 1240. The link 1240 may be, may include, or may be implemented by, a bus, one or more point-to-point connections (e.g., intra-chip connections and/or inter-chip connections), and/or other connections for facilitating connection of and/or communication between various components of the electronic system 1200.

The link 1240 couples (e.g., connects) to the processor(s) 1205. In an aspect, the processor(s) 1205 of the illustrated example is hardware. For example, the processor(s) 1205 can be implemented by one or more integrated circuits, logic circuits, processors, and/or controllers from any desired family or manufacturer. The processor(s) 1205 includes one or more processing units 1245 configured via instructions 1255 stored in a local memory 1250 (e.g., a cache) of the processor(s) 1205. In an aspect, the instructions 1255 may include instructions that when executed, perform at least some instructions of FIGS. 4 and 6 and/or to implement the one or more of the units 900, 1000, and 1100 of FIGS. 9, 10, and 11. The processor(s) 1205 is in communication with the volatile memory 1210, non-volatile memory 1215, and the mass storage device(s) 1220 via the link 1240. In an aspect, the processor(s) 1205 may be, may include, or may be a part of, the interference mitigation unit 900 of FIG. 9, flight management unit 1000 of FIG. 10, and UAV processing unit 1100 of FIG. 11. In an aspect, the processing units 1245 may be, may include, or may be a part of, the interference mitigation unit 900 of FIG. 9, flight management unit 1000 of FIG. 10, and UAV processing unit 1100 of FIG. 11.

The link 1240 couples (e.g., connects) to the volatile memory 1210, non-volatile memory 1215, and mass storage device(s) 1220. The volatile memory 1210 may include synchronous dynamic random access memory (SDRAM), dynamic RAM (DRAM), static RAM (SRAM) Rambus dynamic RAM (RDRAM), and/or other types of volatile memory. The non-volatile memory 1215 may include read-only memory (ROM), programmable ROM (PROM), erasable programmable ROM (EPROM), electrically erasable programmable (EEPROM), flash memory, non-volatile RAM (NVRAM), and/or other types of non-volatile memory. The non-volatile memory 1215 may store instructions and data even when the electronic system 1200 is off.

The mass storage device(s) 1220 may include floppy disk drives, hard disk drives, compact disk drives, DVD drives, Blu-ray Disc™ drives, redundant array of independent disks (RAID) systems, solid state memories, and/or other devices that allow storage. Access to the volatile memory 1210, non-volatile memory 1215, and mass storage device(s) 1220 may be controlled by a memory controller (not shown). In an aspect, the coded instructions 1255 corresponding to at least some instructions of FIGS. 4 and/or 6 may be stored in the volatile memory 1210, non-volatile memory 1215, mass storage device(s) 1220, local memory 1250, and/or on a removable tangible computer readable storage medium, such as a disk 1260 (e.g., CD, DVD, or Blu-ray Disc™).

The link 1240 couples (e.g., connects) to the network interface(s) 1225. The network interface(s) 1225 may couple the electronic system 1200 to one or more networks 1265. In this manner, the electronic system 1200 can be a part of a network of devices, such as a local area network (LAN), a WAN, or an Intranet, or a network of networks, such as the Internet. In an embodiment, the network interface(s) 1225 may facilitate communication between the electronic system 1200 and a cellular network, such as a cellular network that includes the RAN 120, aerial traffic management system 130, and/or core network 135 of FIG. 1. In this regard, the network interface(s) 1225 may also facilitate communication between the electronic system 1200 and the terrestrial UE 115. The network interface(s) 1225 may be implemented by any type of interface standard, such as an Ethernet interface, a universal serial bus (USB) interface, a PCI express interface, a wireless network interface (e.g., wireless LAN interface), a cellular network interface, and/or other interfaces. For example, a cellular network interface may provide support for Global System for Mobile Communications (GSM)-based cellular networks, code division multiple access (CDMA)-based cellular networks, and/or other cellular networks. The network interface(s) 1225 may include a communication device such as a transmitter, receiver, transceiver, modem, and/or network interface card to facilitate exchange of data with external machines (e.g., computing devices of any kind) via the network(s) 1265. In an aspect, the network interface(s) 1225 may be structured to implement the communication transceiver 905, 1005, or 1105 of FIG. 9, 10, or 11.

The link 1240 couples (e.g., connects) to the input device interface(s) 1230. The input device interface(s) 1230 may couple the electronic system 1200 to one or more input devices 1270. The input device(s) 1270 may enable a user to provide (e.g., enter) data and commands to the electronic system 1200. For example, the user may be an operator of the UAV 105 when the electronic system 1200 is disposed on the UAV 105 or when the electronic system 1200 is a remote control device (e.g., the terrestrial UE 115) of the UAV 105. The input device(s) 1270 may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the electronic system 1200. Also, many systems, such as the electronic system 1200, can allow a user to provide data and commands using physical gestures, such as, but not limited to, hand or body movements, facial expressions, and face recognition. In this regard, the user input may be received in any form, such as audio (e.g., speech), visual, and/or tactile. For example, in an aspect, to adjust a flight path of a UAV (e.g., the UAV 105) that is, includes, or is a part of the electronic system 1200, the user may enter text via a physical keyboard communicatively connected to the electronic system 1200 via the input device interface(s) 1230. The text input may be relayed to the processor(s) 1205 via the input device interface(s) 1230 and the link 1240. The processor(s) 1205 may process the text input into commands to adjust the flight path of the UAV and facilitate implementation of the commands.

The link 1240 couples (e.g., connects) to the output device interface(s) 1235. The output device interface(s) 1235 may couple the electronic system 1200 to one or more output devices 1275. The output device interface(s) 1235 may include a graphics and/or audio driver card, graphics and/or audio driver chip, and/or graphics and/or audio driver processor. The output device(s) 1275 may enable the electronic system 1200 to provide output information to a user. The output device(s) 1275 may include, for example, display devices (e.g., a light emitting diode (LED), an organic LED (OLED), a liquid crystal display (LCD)), audio devices (e.g., speakers), audiovisual devices, and/or other output devices. In this regard, the output information may provide feedback to the user in any form, such as visual feedback, auditory feedback, and/or tactile feedback. For example, in an aspect, a UAV (e.g., the UAV 105) that is, includes, or is a part of the electronic system 1200 may provide operational characteristics, such as remaining battery power, remaining fuel level, remaining actions to be performed, current position in a flight path, component health (e.g., engine health, battery health), to a display coupled to the UAV (e.g., wired or wirelessly coupled) via the output device interface(s) 1235 and viewable by the user.

In one or more embodiments, FIGS. 4 and 6 illustrate example machine readable instructions for the interference mitigation unit 900 and/or components thereof, the flight management unit 1000 and/or components thereof, and/or the UAV processing unit 1100 and/or components thereof. In these examples, the machine readable instructions may include one or more programs for execution by one or more processors, such as the processor(s) 1205 shown in the electronic system 1200. The one or more programs, or portion(s) thereof, may be embodied in software stored on a tangible computer readable storage medium, such as a CD-ROM, a floppy disk, a hard drive, a DVD, a Blu-ray Disc™, and/or a memory associated with the processor(s) 1205, but the entire program or programs and/or portions thereof may alternatively be executed by a device other than the processor(s) 1205, and/or embodied in firmware or dedicated hardware (e.g., implemented by an ASIC, a PLD, an FPLD, discrete logic, etc.). Further, although the example program(s) is described with reference to the flow diagrams illustrated in FIGS. 4 and 6, many other methods may be used. For example, with reference to the flow diagrams illustrated in FIGS. 4 and 6, the order of execution of the blocks may be changed, and/or some of the blocks described may be changed, removed, combined, and/or subdivided into multiple blocks.

The example processes 400 and 600 of FIGS. 4 and 6, respectively, may be implemented using coded instructions (e.g., computer and/or machine readable instructions) stored on a tangible computer readable storage medium such as a hard disk drive, flash memory, ROM, RANI, CD, DVD, cache and/or any other storage device or storage disk in which information is stored for any duration (e.g., for extended time periods, permanently, for brief instances, for temporarily buffering, and/or for caching of the information). Alternatively or in addition, the example processes 400 and 600 of FIGS. 4 and 6, respectively, may be implemented using coded instructions (e.g., computer and/or machine readable instructions) stored on a non-transitory computer and/or machine readable medium such as a hard disk drive, flash memory, ROM, RAM, CD, DVD, cache and/or any other storage device or storage disk in which information is stored for any duration (e.g., for extended time periods, permanently, for brief instances, for temporarily buffering, and/or for caching of the information). As used herein, the terms "tangible computer readable storage medium" and "non-transitory computer readable medium" are expressly defined to include any type of computer readable storage device and/or storage disk and to exclude propagating signals and to exclude transmission media. As used herein, "tangible computer readable storage medium" and "tangible machine readable storage medium" are used interchangeably.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of the present disclosure is not limited to such standards and protocols. For instance, each of the standards for Internet and other packet switched network transmission (e.g., Transmission Control Protocol (TCP)/Internet Protocol (IP), User Datagram Protocol (UDP)/IP, Hypertext Markup Language (HTML), Hypertext Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by the present disclosure and are intended to be included within the scope of the accompanying claims.

Additionally, although embodiments of the present disclosure provide example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the foregoing provides example systems, methods, and articles of manufacture, the examples are not the only way to implement such systems, methods, and articles of manufacture. Therefore, although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the claims either literally or under the doctrine of equivalents.

What is claimed is:

1. A method comprising:
   receiving, by a system comprising a processor, from a base station of a radio access network, an indication of an interference event associated with the base station;
   determining, by the system, a group of unmanned aerial vehicles (UAVs) associated with the base station during flight of the group of UAVs, wherein the interference event is at least partially attributed to at least a subgroup of the group of UAVs;
   selecting, by the system, a UAV of the group of UAVs based on respective traffic profiles associated with the subgroup of the group of UAVs; and
   communicating, by the system, an instruction to the UAV to cause an adjustment of an operation of the UAV to reduce an interference impact of the UAV on the base station.

2. The method of claim 1, wherein the base station is referenced as a neighboring base station of a respective serving base station of the subgroup of the group of UAVs.

3. The method of claim 1, wherein the base station is located within a threshold distance of a respective serving base station of the subgroup of the group of UAVs.

4. The method of claim 1, wherein, for the subgroup of the group of UAVs, the respective traffic profiles are indicative of respective priorities associated with the subgroup of the group of UAVs, and wherein the selecting is based at least on the respective priorities associated with the subgroup of the group of UAVs of UAVs.

5. The method of claim 4, wherein a priority associated with the UAV is lower than other priorities associated with other UAVs of the subgroup of the group of UAVs other than the UAV.

6. The method of claim 1, wherein the instruction comprises an instruction to adjust at least one of a data compression associated with the UAV, a throughput associated with the UAV, a queueing scheme associated with the UAV, an uplink power associated with the UAV, or a communication protocol associated with the UAV.

7. The method of claim 1, wherein the instruction comprises an instruction to migrate the UAV from being connected via the radio access network to being connected via a different network other than the radio access network.

8. The method of claim 1, wherein the UAV is a first UAV, wherein the instruction is a first instruction, wherein the interference impact is a first interference impact, and further comprising:
   determining, by the system after the communicating, that the interference event has not been mitigated;
   selecting, by the system, a second UAV of the subgroup of the group of UAVs based at least on a traffic profile associated with the second UAV; and
   communicating, by the system, a second instruction to the second UAV to cause another adjustment of another operation of the second UAV to reduce a second interference impact on the base station associated with the second UAV.

9. The method of claim 8, wherein the interference event comprises an interference above a threshold value for the base station, and wherein the interference event is determined to have been mitigated when the interference for the base station is below the threshold value.

10. The method of claim 1, further comprising:
    determining, by the system after the communicating, that the interference event has not been mitigated; and communicating, by the system, a second instruction to the UAV to cause a further adjustment of the operation of the UAV.

11. The method of claim 1, wherein the respective traffic profiles associated with the subgroup of the group of UAVs comprise respective priorities associated with the subgroup of the group of UAVs, and wherein the respective priorities indicate whether respective content associated with respective communications of the subgroup of the group of UAVs comprises high definition content defined according to a high definition format.

12. A non-transitory machine readable medium comprising machine readable instructions stored therein, which, when executed, cause a processor of a device to perform operations, the operations comprising:
receiving an indication of an interference event associated with a base station of a radio access network;
identifying an unmanned aerial vehicle (UAV) associated with the interference event based on a profile associated with the UAV, wherein the identifying comprises selecting the UAV from among a set of UAVs, and wherein the interference event is at least partially attributed to each UAV of the set of UAVs; and
providing, during a flight of the UAV, an instruction to the UAV to cause an adjustment of an operation of the UAV to reduce an interference impact of the UAV on the base station.

13. The non-transitory machine readable medium of claim 12, wherein the profile associated with the UAV is indicative of a priority associated with the UAV relative to other UAVs of the set of UAVs other than the UAV.

14. The non-transitory machine readable medium of claim 12, wherein a priority of the UAV is a first priority of the UAV, wherein the instruction is a first instruction, wherein the interference impact is a first interference impact, and wherein the operations further comprise:
after the providing, determining that the interference event has not been mitigated;
selecting a second UAV based on a second priority associated with the second UAV; and
providing a second instruction to the second UAV to cause another adjustment of another operation of the second UAV to reduce a second interference impact of the second UAV on the base station.

15. A system, comprising:
a processor; and
a memory, coupled to the processor, that stores executable instructions that, when executed by the processor, facilitate performance of operations, comprising:
receiving, from base station equipment that is part of a radio access network, an indication of an interference event associated with the base station equipment;
determining unmanned aerial vehicles (UAVs) associated with the base station equipment during flight of the UAVs, wherein the interference event is at least partially attributed to at least some of the UAVs;
selecting a UAV of the UAVs based on traffic profiles respectively associated with the at least some of the UAVs; and
transmitting an instruction to the UAV to cause an adjustment of an operation of the UAV to reduce an interference impact of the UAV on the base station equipment.

16. The system of claim 15, wherein the base station equipment is referenced as neighboring base station equipment of respective serving base station equipment of the at least some of the UAVs.

17. The system of claim 15, wherein the base station equipment is located within a threshold distance of respective serving base station equipment of the at least some of the UAVs.

18. The system of claim 15, wherein, for the at least some of the UAVs, the traffic profiles respectively associated with the at least some of the UAVs are indicative of respective priorities associated with the at least some of the UAVs, and wherein the selecting is based at least on the respective priorities.

19. The system of claim 18, wherein a priority associated with the UAV is lower than other priorities associated with other UAVs of the at least some of the UAVs other than UAV.

20. The system of claim 15, wherein the instruction is to adjust at least one of a data compression associated with the UAV, a throughput associated with the UAV, a queueing scheme associated with the UAV, an uplink power associated with the UAV, or a communication protocol associated with the UAV.

* * * * *